(12) United States Patent
Maruyama et al.

(10) Patent No.: US 7,580,348 B2
(45) Date of Patent: Aug. 25, 2009

(54) COMMUNICATION APPARATUS, CONTROL METHOD, AND COMPUTER READABLE INFORMATION RECORDING MEDIUM

(75) Inventors: Ryo Maruyama, Kawasaki (JP); Yoshinari Akakura, Yokohama (JP); Masaki Deguchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 11/024,124

(22) Filed: Dec. 28, 2004

(65) Prior Publication Data

US 2005/0135235 A1 Jun. 23, 2005

Related U.S. Application Data

(63) Continuation of application No. PCT/JP02/12530, filed on Nov. 29, 2002.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/219; 370/221; 370/235; 370/244

(58) Field of Classification Search .......... 370/235, 370/219, 221, 244
See application file for complete search history.

(56) References Cited

U.S. PATENT DOCUMENTS

| | | | |
|---|---|---|---|
| 4,845,710 A | 7/1989 | Nakamura et al. | |
| 5,473,599 A * | 12/1995 | Li et al. | 370/219 |
| 6,832,373 B2 * | 12/2004 | O'Neill | 717/171 |
| 6,839,829 B1 * | 1/2005 | Daruwalla et al. | 712/28 |
| 7,058,007 B1 * | 6/2006 | Daruwalla et al. | 370/216 |
| 2005/0089027 A1 * | 4/2005 | Colton | 370/380 |
| 2005/0135235 A1 * | 6/2005 | Maruyama et al. | 370/219 |

FOREIGN PATENT DOCUMENTS

| | | |
|---|---|---|
| JP | 63-209347 | 8/1988 |
| JP | 02-135839 | 5/1990 |
| JP | 05-167619 | 7/1993 |
| JP | 07-066836 | 3/1995 |
| JP | 8-163152 | 6/1996 |
| JP | 11-154989 | 6/1999 |
| JP | 2001-136234 | 5/2001 |
| JP | 2001-339370 | 12/2001 |

OTHER PUBLICATIONS

Japanese Office Action mailed Jul. 17, 2007, from the corresponding Japanese Application.

* cited by examiner

*Primary Examiner*—Kevin C Harper
*Assistant Examiner*—Jianye Wu
(74) *Attorney, Agent, or Firm*—Katten Muchin Roseman LLP

(57) ABSTRACT

In order to rapidly restoration at a time of fault occurrence without lowering usage efficiency of circuit resources, in a configuration in which a plurality of physical circuits are grouped and communication is carried out with transmission data being distributed, a circuit having the minimum traffic from among the grouped circuits is set as a standby circuit, and, a traffic in a fault circuit is transferred to the standby circuit in a lump when a fault occurs in another working circuit.

36 Claims, 30 Drawing Sheets

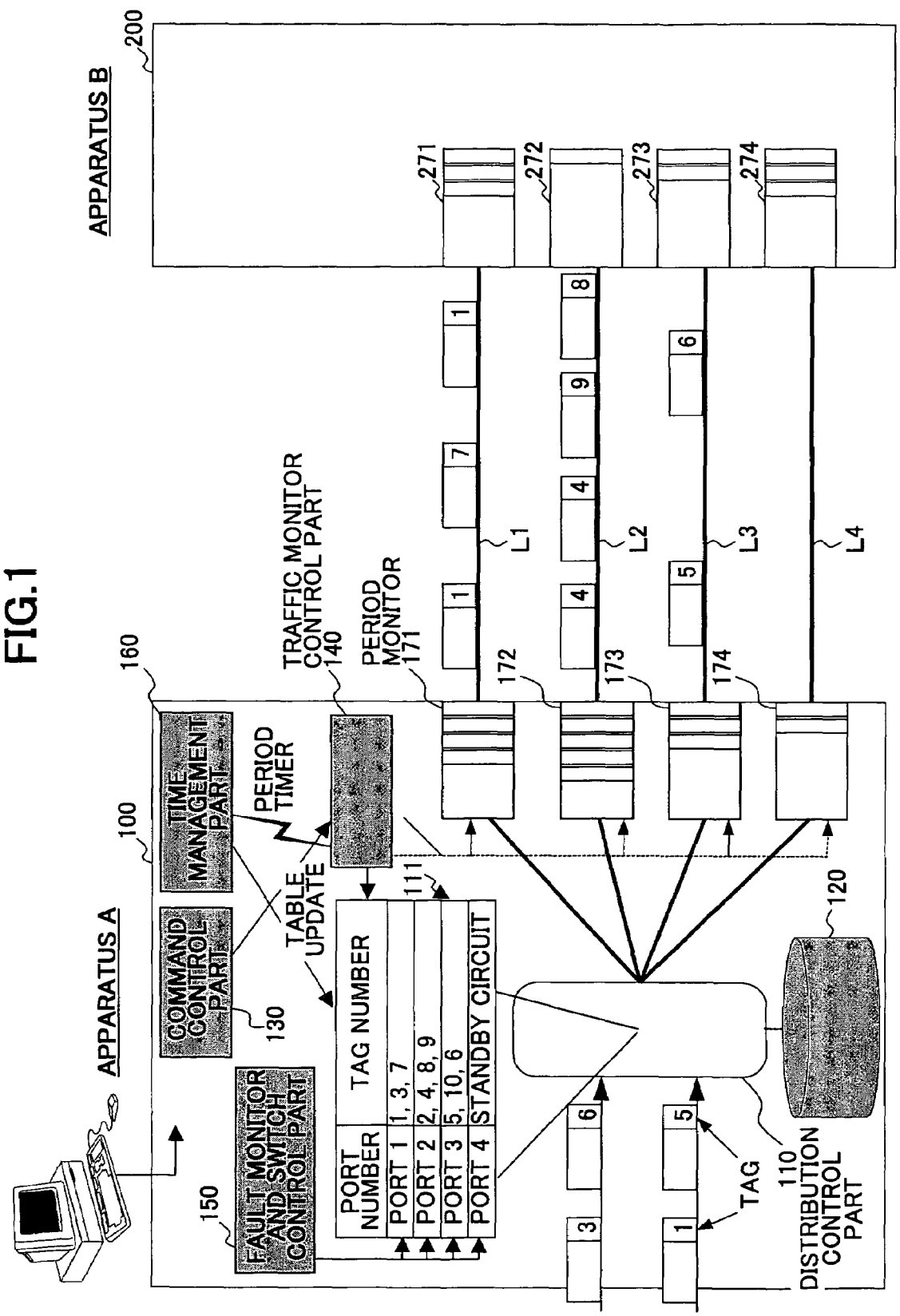

FIG.2B

RELEASING REFERENCE VALUE: U% (UPPER LIMIT)
DISTRIBUTION REFERENCE VALUE: L% (LOWER LIMIT)
RELEASING DETERMINATION VALUE: AU = U*(D−1)
DISTRIBUTION DETERMINATION VALUE: AL = L*(D−1)
PORT NUMBER: N
NUMBER OF WORKING CIRCUITS: D
LOAD RATE TOTAL: S
PROCESSING COUNTER: C

FIG.2C

| PORT NUMBER | LOAD RATE | LOAD ORDER |
|---|---|---|
| 1 | 60% | 1 |
| 2 | 30% | 3 |
| 3 | 20% | 4 |
| 4 | 40% | 2 |
| ⋮ | ⋮ | ⋮ |
| N | X(N)% | N |

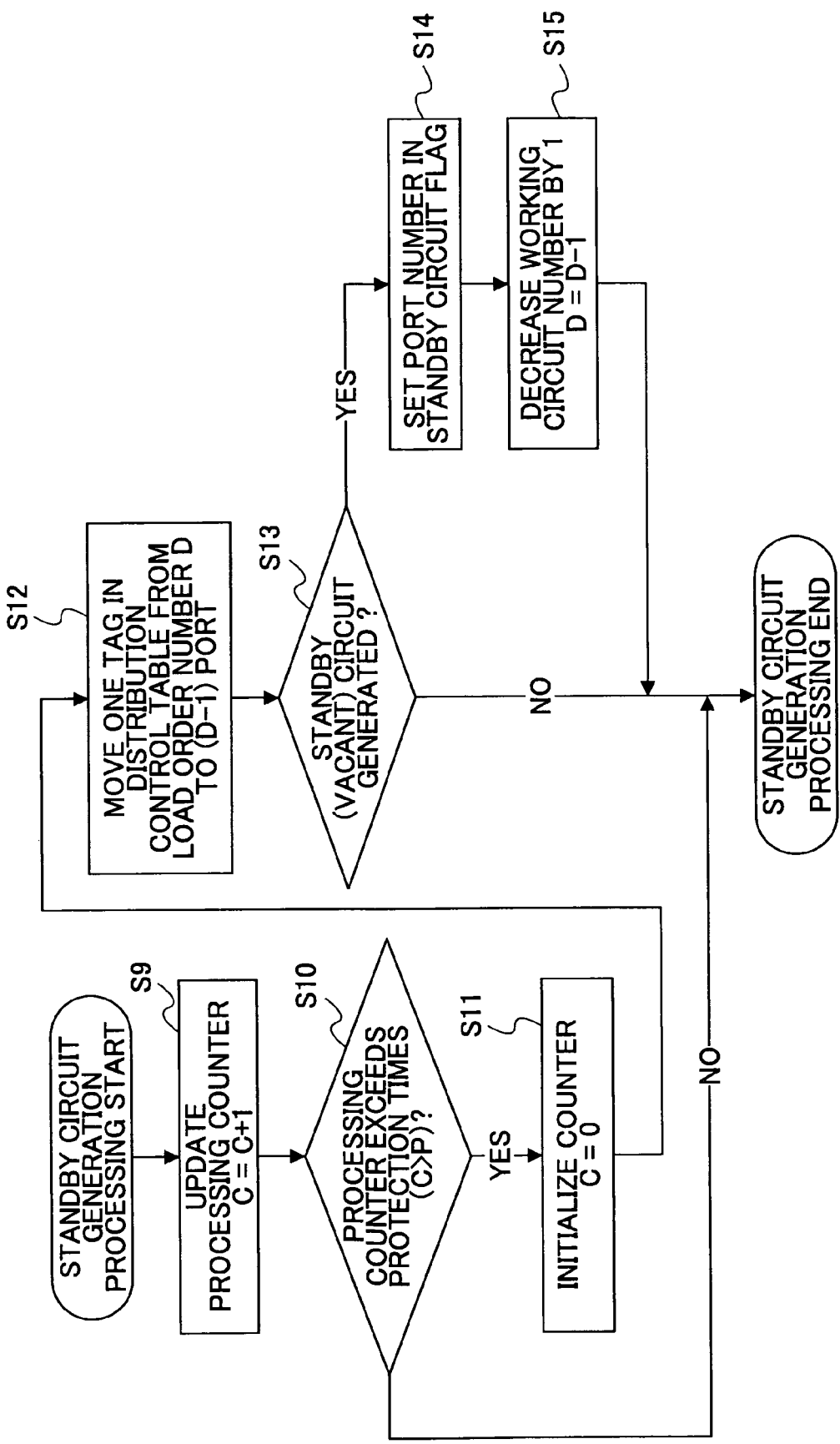

FIG.3B

```
PROCESSING COUNTER: C
PROTECTION TIMES: P
PORT NUMBER: N
WORKING CIRCUIT NUMBER: D
STANDBY CIRCUIT FLAG:
R[N] = STANDBY CIRCUIT PORT NUMBER
(DEFAULT 0: NO STANDBY CIRCUIT)
```

FIG.4B

| PORT NUMBER | TAG NUMBER |
|---|---|
| PORT 1 | 1, 3, 7, 9, 12, ····· |
| PORT 2 | 2, 4, 8, 13, 16, ····· |
| PORT 3 | 5, 10, 17, 19, ····· |
| PORT 4 | 6, 11, 14, 15, 18, ····· |

FIG.5B

PROCESSING COUNTER: C
PROTECTION TIMES: P
PORT NUMBER: N
WORKING CIRCUIT NUMBER: D
STANDBY CIRCUIT FLAG:
R[N] = STANDBY CIRCUIT PORT NUMBER
(DEFAULT 0: NO STANDBY CIRCUIT)

FIG.5C

| PORT NUMBER | TAG NUMBER |
|---|---|
| PORT 1 | 1, 3, 7, 9, 12, ····· |
| PORT 2 | 2, 4, 8, 13, 16, ····· |
| PORT 3 | 5, 10, 17, 19, ····· |
| PORT 4 | 6, 11, 14, 15, 18, ····· |

FIG.6A

UPPER LIMIT: U = 80%
LOWER LIMIT L = 60%
PORT NUMBER: N = 4 PORTS
WORKING CIRCUIT NUMBER: D = 4
RELEASING DETERMINATION VALUE: AU = 80*(4-1) = 240%
DISTRIBUTION DETERMINATION VALUE AL = 60*(4-1) = 180%
LOAD RATE TOTAL (FIRST TIME): S = 65+25+20+40 = 150%

FIG.6B

| PORT NUMBER | LOAD RATE | LOAD ORDER |
|---|---|---|
| 1 | 65% | 1 |
| 2 | 25% | 3 |
| 3 | 20% | 4 |
| 4 | 40% | 2 |

FIG.6C

| PORT NUMBER | LOAD RATE | LOAD ORDER |
|---|---|---|
| 1 | 65% | 1 |
| 2 | 30% | 3 |
| 3 | 15% | 4 |
| 4 | 40% | 2 |

FIG.6D

| PORT NUMBER | LOAD RATE | LOAD ORDER |
|---|---|---|
| 1 | 65% | 1 |
| 2 | 35% | 3 |
| 3 | 10% | 4 |
| 4 | 40% | 2 |

FIG.6E
| PORT NUMBER | TAG NUMBER |
|---|---|
| PORT 1 | 1, 3, 7, 9, 12, 20 |
| PORT 2 | 2, 4, 8, 13, 16 |
| PORT 3 | 5, 10, 17, 19 |
| PORT 4 | 6, 11, 14, 15, 18 |
FIG.6F
| PORT NUMBER | TAG NUMBER |
|---|---|
| PORT 1 | 1, 3, 7, 9, 12, 20 |
| PORT 2 | 2, 4, 8, 13, 16, 19 |
| PORT 3 | 5, 10, 17 |
| PORT 4 | 6, 11, 14, 15, 18 |
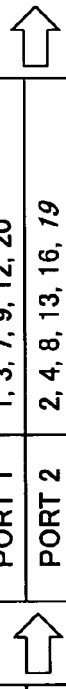
FIG.6G
| PORT NUMBER | TAG NUMBER |
|---|---|
| PORT 1 | 1, 3, 7, 9, 12, 20 |
| PORT 2 | 2, 4, 8, 13, 16, *19, 17* |
| PORT 3 | 5, 10 |
| PORT 4 | 6, 11, 14, 15, 18 |
FIG.6H
| PORT NUMBER | LOAD RATE | LOAD ORDER |
|---|---|---|
| 1 | 60% | 1 |
| 2 | 40% | 2 |
| 3 | 5% | 4 |
| 4 | 35% | 3 |
FIG.6I
| PORT NUMBER | LOAD RATE | LOAD ORDER |
|---|---|---|
| 1 | 65% | 1 |
| 2 | 45% | 2 |
| 3 | 0% | 4 |
| 4 | 45% | 3 |
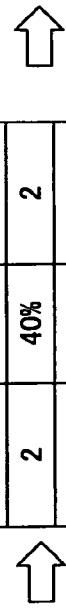
FIG.6J
| PORT NUMBER | TAG NUMBER |
|---|---|
| PORT 1 | 1, 3, 7, 9, 12, 20 |
| PORT 2 | 2, 4, 8, 13, 16, *19, 17, 10* |
| PORT 3 | 5 |
| PORT 4 | 6, 11, 14, 15, 18 |
FIG.6K
| PORT NUMBER | TAG NUMBER |
|---|---|
| PORT 1 | 1, 3, 7, 9, 12, 20 |
| PORT 2 | 2, 4, 8, 13, 16, *19, 17, 10* |
| PORT 3 | *STANDBY CIRCUIT GENERATED* |
| PORT 4 | 6, 11, 14, 15, 18, *5* |

FIG.7A

```
UPPER LIMIT: U = 80%
LOWER LIMIT L = 60%
PORT NUMBER: N = 4 PORTS
WORKING CIRCUIT NUMBER: D = 3
RELEASING DETERMINATION VALUE: AU = 80*(3-1) = 160%
DISTRIBUTION DETERMINATION VALUE AL = 60*(3-1) = 120%
LOAD RATE TOTAL (FIRST TIME): S = 75+65+0+50 = 190%
```

FIG.7B
| PORT NUMBER | LOAD RATE | LOAD ORDER |
|---|---|---|
| 1 | 75% | 1 |
| 2 | 65% | 2 |
| 3 | 0% | 4 |
| 4 | 50% | 3 |
FIG.7C
| PORT NUMBER | LOAD RATE | LOAD ORDER |
|---|---|---|
| 1 | 70% | 1 |
| 2 | 65% | 2 |
| 3 | 10% | 4 |
| 4 | 50% | 3 |
FIG.7D
| PORT NUMBER | LOAD RATE | LOAD ORDER |
|---|---|---|
| 1 | 60% | 2 |
| 2 | 65% | 1 |
| 3 | 20% | 4 |
| 4 | 50% | 3 |
FIG.7E
| PORT NUMBER | TAG NUMBER |
|---|---|
| PORT 1 | 1, 3, 7, 9, 12, 16, 17, 19, 22, 23 |
| PORT 2 | 2, 4, 8, 13, 10, 5, 21, 24 |
| PORT 3 | STANDBY CIRCUIT |
| PORT 4 | 6, 11, 14, 15, 18, 20 |
FIG.7F
| PORT NUMBER | TAG NUMBER |
|---|---|
| PORT 1 | 1, 3, 7, 9, 12, 16, 17, 19, 22 |
| PORT 2 | 2, 4, 8, 13, 10, 5, 21, 24 |
| PORT 3 | 23 |
| PORT 4 | 6, 11, 14, 15, 18, 20 |
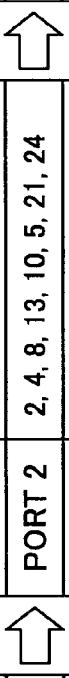
FIG.7G
| PORT NUMBER | TAG NUMBER |
|---|---|
| PORT 1 | 1, 3, 7, 9, 12, 16, 17, 19 |
| PORT 2 | 2, 4, 8, 13, 10, 5, 21, 24, |
| PORT 3 | 23, 22 |
| PORT 4 | 6, 11, 14, 15, 18, 20 |
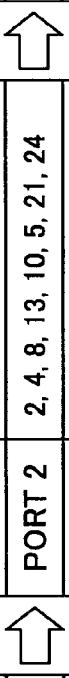

FIG.8A

```
UPPER LIMIT: U = 80%
LOWER LIMIT L = 60%
PORT NUMBER: N = 4 PORTS
WORKING CIRCUIT NUMBER: D = 3
RELEASING DETERMINATION VALUE: AU = 80*(3-1) = 160%
DISTRIBUTION DETERMINATION VALUE AL = 60*(3-1) = 120%
LOAD RATE TOTAL (FIRST TIME): S = 90+35+0+30 = 155%
```

FIG.8B

| PORT NUMBER | LOAD RATE | LOAD ORDER |
|---|---|---|
| 1 | 90% | 1 |
| 2 | 35% | 2 |
| 3 | 0% | 4 |
| 4 | 30% | 3 |

FIG.8C

| PORT NUMBER | LOAD RATE | LOAD ORDER |
|---|---|---|
| 1 | 80% | 1 |
| 2 | 35% | 3 |
| 3 | 0% | 4 |
| 4 | 40% | 2 |

FIG.8D

| PORT NUMBER | LOAD RATE | LOAD ORDER |
|---|---|---|
| 1 | 65% | 1 |
| 2 | 50% | 2 |
| 3 | 0% | 4 |
| 4 | 40% | 3 |

FIG.8E

| PORT NUMBER | TAG NUMBER |
|---|---|
| PORT 1 | 1, 3, 7, 9, 12, 16, 17, 19, 22, 23 |
| PORT 2 | 2, 4, 8, 13, 10, 5 |
| PORT 3 | STANDBY CIRCUIT |
| PORT 4 | 6, 11, 14, 15 |

FIG.8F

| PORT NUMBER | TAG NUMBER |
|---|---|
| PORT 1 | 1, 3, 7, 9, 12, 16, 17, 19, 22 |
| PORT 2 | 2, 4, 8, 13, 10, 5 |
| PORT 3 | STANDBY CIRCUIT |
| PORT 4 | 6, 11, 14, 15, 23 |

FIG.8G

| PORT NUMBER | TAG NUMBER |
|---|---|
| PORT 1 | 1, 3, 7, 9, 12, 16, 17, 19 |
| PORT 2 | 2, 4, 8, 13, 10, 5, 22 |
| PORT 3 | STANDBY CIRCUIT |
| PORT 4 | 6, 11, 14, 15, 23 |

STANDBY CIRCUIT FLAG:
R[N] = STANDBY CIRCUIT NUMBER
(DEFAULT 0: NO STANDBY CIRCUIT)

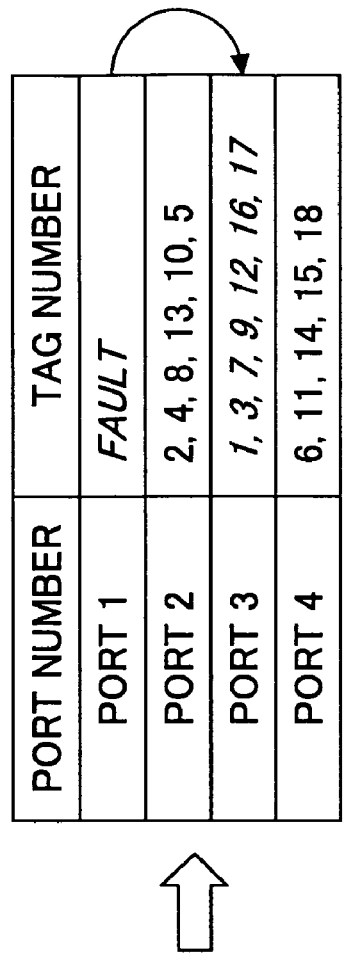

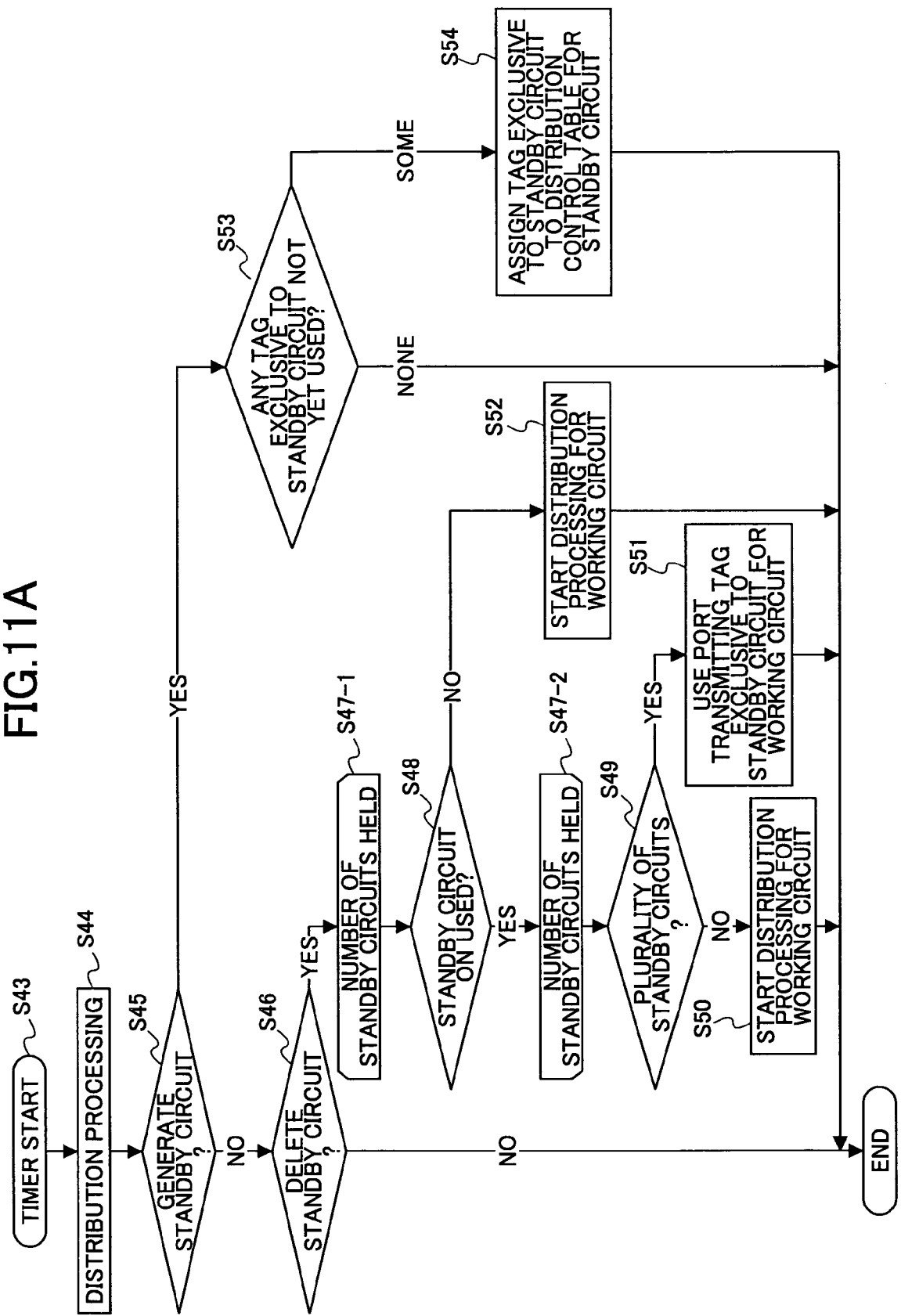

FIG.13A

| PORT NUMBER | TAG NUMBER |
|---|---|
| PORT 1 | 1, 5, 12, 28 |
| PORT 2 | 2, 55, 38, |
| PORT 3 | 112 |
| PORT 4 | 3, 4, 18, 153, 196 |
| PORT 5 | 7 |

FIG.13B

| PORT NUMBER | TAG NUMBER |
|---|---|
| PORT 1 | 1, 5, 12, 28 |
| PORT 2 | 2, 55, 38, 112 |
| PORT 3 | 200, 34, 2, 79 |
| PORT 4 | 3, 4, 18, 153, 196 |
| PORT 5 | 7 |

FIG.13C

| PORT NUMBER | TAG NUMBER |
|---|---|
| PORT 1 | 1, 5, 12, 28, 7 |
| PORT 2 | 2, 55, 38, 112 |
| PORT 3 | 200, 34, 2, 79 |
| PORT 4 | 3, 4, 18, 153, 196 |
| PORT 5 | — |

FIG.13D

| PORT NUMBER | TAG NUMBER |
|---|---|
| PORT 1 | 1, 5, 12, 28, 7 |
| PORT 2 | 2, 55, 38, 112 |
| PORT 3 | 200, 34, 2 |
| PORT 4 | 3, 4, 18, 153, 196 |
| PORT 5 | 79 |

FIG.13E

| PORT NUMBER | TAG NUMBER |
|---|---|
| PORT 1 | —(CIRCUIT BREAK) |
| PORT 2 | 2, 55, 38, 112 |
| PORT 3 | 200, 34, 2 |
| PORT 4 | 3, 4, 18, 153, 196 |
| PORT 5 | 1, 5, 12, 28, 7 |

FIG.14A

| PORT NUMBER | TRAFFIC |
|---|---|
| PORT 1 | 50 % |
| PORT 2 | 60 % |
| PORT 3 | 0 % |
| PORT 4 | 60 % |
| PORT 5 | 10 % |

FIG.14B

| PORT NUMBER | TRAFFIC |
|---|---|
| PORT 1 | 55 % |
| PORT 2 | 60 % |
| PORT 3 | 30 % |
| PORT 4 | 60 % |
| PORT 5 | 10 % |

FIG.14C

| PORT NUMBER | TRAFFIC |
|---|---|
| PORT 1 | 75 % |
| PORT 2 | 65 % |
| PORT 3 | 85 % |
| PORT 4 | 60 % |
| PORT 5 | 0 % |

FIG.14D

| PORT NUMBER | TRAFFIC |
|---|---|
| PORT 1 | 70 % |
| PORT 2 | 70 % |
| PORT 3 | 60% |
| PORT 4 | 60 % |
| PORT 5 | 25 % |

FIG.14E

| PORT NUMBER | TRAFFIC |
|---|---|
| PORT 1 | CIRCUIT BREAK |
| PORT 2 | 60 % |
| PORT 3 | 60% |
| PORT 4 | 60 % |
| PORT 5 | 70 % |

| TRAFFIC USAGE RATE | LOWER LIMIT | UPPER LIMIT | DISTRIBUTION FLAG |
|---|---|---|---|
| 0~40 % | 50 % | 70 % | ON(1) |
| 40~60 % | 60 % | 80 % | ON(1) |
| 60~80 % | 70 % | 90 % | ON(1) |
| 80~100 % | 90 % | 95 % | OFF(0) |

FIG.20B

| EVERY DAY | 0:00 ~ 4:00 | 4:00~8:00 | 8:00 ~ 12:00 | 12:00 ~ 16:00 | 16:00 ~ 20:00 | 20:00 ~ 24:00 |
|---|---|---|---|---|---|---|
|  |  |  |  |  |  |  |

FIG.20C

|  | 0:00 ~ 24:00 |
|---|---|
| MON. |  |
| TUE. |  |
| WED. |  |
| THU. |  |
| FRI. |  |
| SAT. |  |
| SUN |  |

|  | 0:00 ~ 6:00 | 6:00 ~ 12:00 | 12:00 ~ 18:00 | 18:00 ~ 24:00 |
|---|---|---|---|---|
| MON. | 20 % | 90 % | 70 % | 50 % |
| TUE. | 30 % | 78 % | 70 % | 50 % |
| WED. | 30 % | 80 % | 60 % | 40 % |
| THU. | 30 % | 80 % | 70 % | 50 % |
| FRI. | 40 % | 70 % | 70 % | 40 % |
| SAT. | 40 % | 50 % | 60 % | 40 % |
| SUN | 20 % | 30 % | 40 % | 20 % |

|  | 0:00 ~ 6:00 | 6:00 ~ 12:00 | 12:00 ~ 18:00 | 18:00 ~ 24:00 |
|---|---|---|---|---|
| MON. | 40 % | – | 70 % | 60 % |
|  | 60 % | – | 90 % | 80 % |
|  | ON | OFF | ON | ON |
| TUE. |  |  |  |  |
| WED. |  |  |  |  |
| THU. |  |  |  |  |
| FRI. |  |  |  |  |
| SAT. |  |  |  |  |
| SUN | 40 % | 50 % | 50 % | 40 % |
|  | 60 % | 70 % | 70 % | 60 % |
|  | ON | ON | ON | ON |

FIG.22C

| AVERAGE TRAFFIC USAGE RATE | LOWER LIMIT | UPPER LIMIT | DISTRIBUTION FLAG |
|---|---|---|---|
| 0 ~ 20 % | 40 % | 60 % | ON |
| 21 ~ 40 % | 50 % | 70 % | ON |
| 41 ~ 60 % | 60 % | 80 % | ON |
| 61 ~ 80 % | 70 % | 90 % | ON |
| 81 ~ 100 % | - | - | OFF |

COMMUNICATION APPARATUS, CONTROL METHOD, AND COMPUTER READABLE INFORMATION RECORDING MEDIUM

CROSS-REFERENCE TO RELATED APPLICATION

This application is a U.S. continuation application filed under 35 USC 111(a) claiming benefit under 35 USC 120 and 365(c) of PCT application JP02/12530 filed on Nov. 29, 2002, which is herein incorporated by reference.

BACKGROUND OF THE INVENTION

1. Field of the Invention

The present invention relates to a communication apparatus, a control method, a program and a computer readable information recording medium, and, in particular, to a communication apparatus which applies the Internet protocol (IP) or such, and applies a technology of logically widening a data transmission band by grouping a plurality of circuits, a control method of this communication apparatus, a program for causing a computer to execute the control method, and a computer readable information recording medium storing the program.

2. Description of the Related Art

Recently, thanks to a sharp spread of the Internet or such, a demand for IP data communication apparatuses increases. Also, a scope encompassed by such a communication network increases. As a result, a data transmission band required for data transmission between respective communication apparatuses included in the communication network may not be completely covered by a physical single circuit. Therefore, it may become necessary to spread a substantial data transmission band by grouping a plurality of circuits, for example. In such a configuration, in order to ensure a required communication quality, a standby circuit may be provided for allocating an extra traffic occurring upon occurrence of a fault on a working circuit.

In a field of data communication, conventionally, a main purpose of the communication is for transmitting images, text, binary data or such, and thus, upon possible occurrence of a fault on a circuit between opposite communication apparatuses, even once lost data may be restored by a technology called 'retry' even if several seconds are taken for recovery from the fault. As a result, no substantial problem may occur. However, since delivery of a motion picture, IP telephone communication or such has recently spread along with the widening of the communication band, a distortion may occur in received data when the above-mentioned retry operation is carried out, and such a distortion may directly be sensed visually or acoustically by a user. In such a case, the user may feel artificiality on the delivered motion picture or such.

As a technology for guaranteeing the quality of transmission data even against such a circuit fault trouble, a method of providing working and standby circuits in such a manner of 1+1, n+1 or such is proposed. That is, upon occurrence of a circuit fault, traffic is transferred from the troubled circuit to a standby circuit (or protection circuit). Such a method may be called a 'protection switching' method. However, according to the protection switching method, a redundancy in resources is required since a standby circuit is provided as an extra circuit. In terms of saving an investment for such an extra facility, at most one circuit may be prepared as the standby circuit for each working circuit (in an N+1 protection switching scheme, one standby circuit is provided for N working circuits). Accordingly, even when this method is applied, data guarantee may not be completely made if double fault occurrence in a same channel for example.

In order to solve this problem, so-called link aggregation system is proposed in which a plurality of physical circuits are regarded as a single logical circuit (bundle of circuits), and, upon occurrence of a circuit fault, circuit transmission data is dynamically moved among the bundle of circuits (group) and re-configuration is carried out therein, whereby communication is guaranteed. According to the link aggregation system, a basic purpose is that, consequently, a large band is ensured as a result of all the circuits included in the plurality of circuits being always used basically. That is, in this system, a setting is made such that data may be transmitted by each of all the circuits. Accordingly, when a fault occurs in a circuit transmitting data included in the circuit group, a setting operation should be carried out for determining which circuit should be allocated by which the transmission data in the fault circuit is transferred then (re-configuration). As a result, a considerable time may be required, which may amount more than that in the case of the conventional protection scheme.

That is, according to the link aggregation system, a data flow rate is equalized among the respective circuits of the group, and, when a circuit has a trouble, control is carried out to dynamically transfer the data flow rate of the fault circuit. In such a case, hash operation or such is carried out for a normal circuit when occurrence of a circuit fault is detected, and, based on the calculation result, a determination is made for a transmission circuit allocation scheme adapting for a new circuit situation after the circuit fault. Accordingly, an extra time may be required, and thus, a situation may occur in which the required traffic of the communication network may not be satisfied even during a short period.

Japanese Laid-open Patent Application No. 11-154989 discloses a scheme in which, for the purpose of circuit equalization and improvement of transmission efficiency upon carrying out data transmission with the use of a plurality of communication circuits, a transmission data length is counted, and, according to the count result, data distribution to the channels is controlled. According to this scheme, circuit allocation operation is carried out each time when the thus-accumulated data length exceeds a predetermined value, and thus, a circuit load equalization is aimed at. However, this document does not disclose specific process to be applied for transferring signals upon occurrence of a fault on a certain circuit.

SUMMARY OF THE INVENTION

The present invention has been devised in consideration of the above-mentioned problem, and an object of the present invention is to provide a system in which, control is made for signal transmission allocation for a transmission circuit group as in the above-mentioned link aggregation system or such, a time required for the control is effectively reduced, thereby a time required for recovery from a circuit fault or such is reduced, and thus, a desired traffic amount in high-rate data transmission can be ensured.

According to the present invention, a predetermined circuit is set as a standby circuit(s) from among grouped circuits, the other working circuits normally bear a traffic of the standby circuit(s), and, upon a fault occur in the working circuit, a traffic of this working circuit is transferred to the standby circuit(s) in a lump. As a result, it becomes possible to minimize a time required for a recovery from the fault.

BRIEF DESCRIPTION OF THE DRAWINGS

Other objects and further features of the present invention will become more apparent from the following detailed description when read in conjunction with the accompanying drawings:

FIG. 1 shows a block diagram of a general configuration of a communication apparatus according to an embodiment of the present invention;

FIGS. 2A, 2B and 2C illustrate distribution processing carried out by the communication apparatus according to the embodiment of the present invention;

FIGS. 3A and 3B illustrate standby circuit generation processing shown in FIG. 2A;

FIGS. 4A and 4B illustrate standby circuit releasing processing shown in FIG. 2A;

FIGS. 5A, 5B and 5C illustrate circuit equalizing processing shown in FIG. 2A;

FIGS. 6A through 6K show transition of setting values, a load rate table and distribution control table for illustrating standby circuit generation processing shown in FIG. 2A;

FIGS. 7A through 7G show transition of the setting values, the load rate table and the distribution control table for illustrating standby circuit releasing processing shown in FIG. 2A;

FIGS. 8A through 8G show transition of the setting values, the load rate table and the distribution control table for illustrate circuit equalizing processing shown in FIG. 2A;

FIGS. 9A, 9B, 10A and 10B illustrate processing of recovery from a fault according to the embodiment of the present invention;

FIGS. 11A, 11B and 12 show operation flow charts illustrating standby circuit exclusive transmission processing carried out by the communication apparatus according to the embodiment of the present invention;

FIGS. 13A through 13E and 14A through 14E show transition of the distribution control table and the load rate table for illustrating the standby circuit exclusive transmission processing carried out by the communication apparatus according to the embodiment of the present invention;

FIGS. 20A, 20B and 20C show one example of the hourly table applicable in the hourly setting processing carried out by the communication apparatus according to the embodiment of the present invention;

FIGS. 22A, 22B and 22C further specifically illustrate the hourly table dynamic setting operation shown in FIG. 21.

DETAILED DESCRIPTION OF THE PREFERRED EMBODIMENT

Figure 2A:
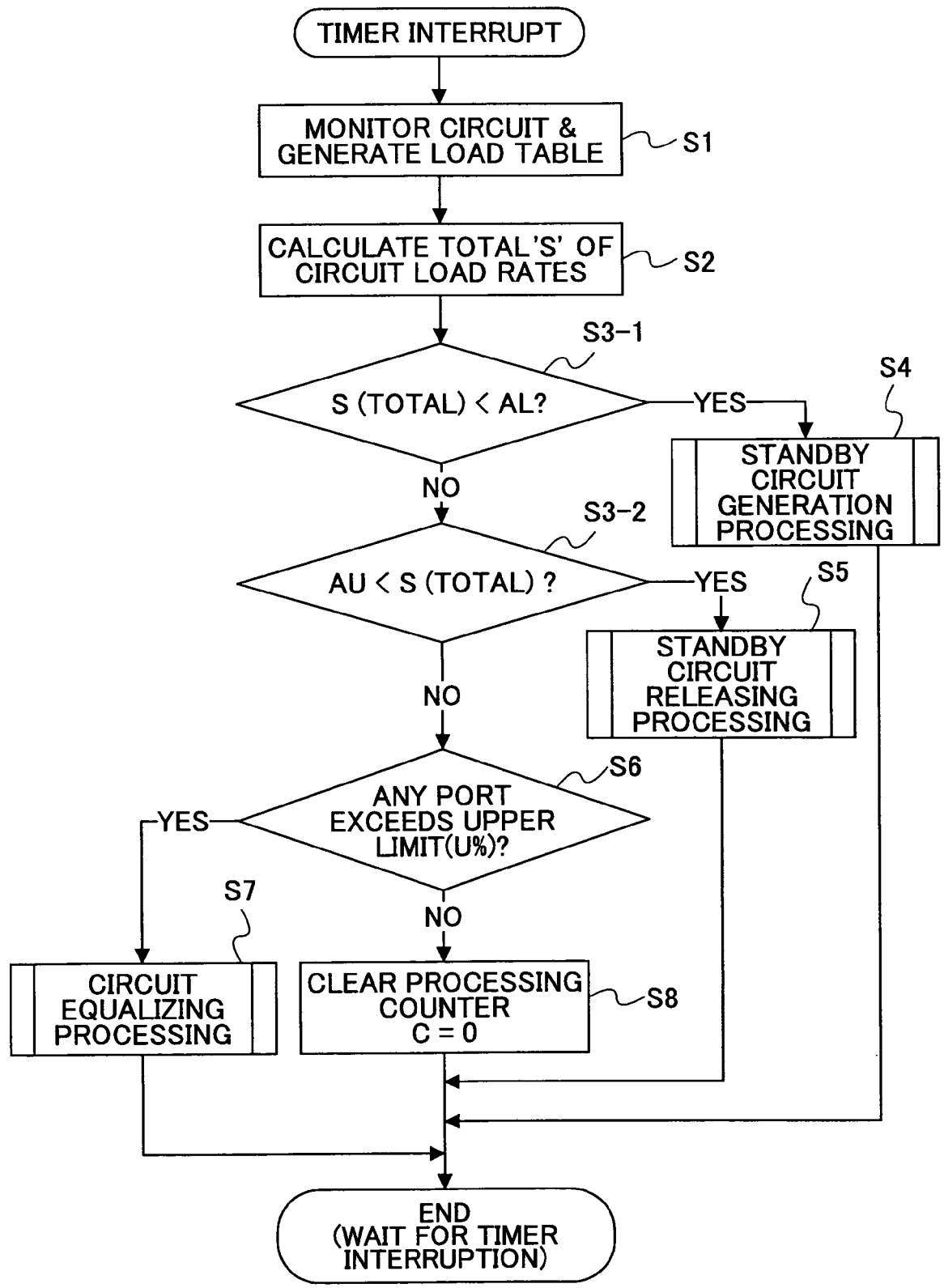

An embodiment of the present invention is described in detail with reference to figures.

FIG. 1 shows a block diagram illustrating a configuration of a communication apparatus according to an embodiment of the present invention The communication apparatus 100 according to the embodiment of the present invention has a function of transmitting packet data to an opposite communication apparatus 200 via predetermined communication circuits, i.e., four communication circuits L1, L2, L3 and L4 in compliance with a standard of Ethernet (registered trade name) X2 or such for example in this embodiment.

This apparatus 100 includes a command control part 130 receiving a user's command from a host apparatus; a traffic monitor control part 140 monitoring traffics and controlling traffics of the communication circuits L1 through L4 in response to an instruction signal from the command control part; a distribution control part 140 distributing data to be transmitted among the above-mentioned four communication circuits; a fault monitor and switch control part 150 monitoring the communication circuits for a fault; and a time management part 160 managing a time schedule of operation of the apparatus.

These respective control parts may be realized by means of respective electronic circuits, or may be realized by means of a general purpose computer including one or a plurality or CPUs with memories operated according to a predetermined operation program, which may be downloaded via a communication network such as the Internet, or LAN, or may be loaded from a computer readable information recording medium such as a CD-ROM or such in which the program is previously recorded.

The distribution control part 110 has a distribution control table 111 in an internal memory to be refereed to when the transmission data is actually distributed among the communication circuits L1 through L4, and the contents of the distribution control table 111 may be updated by the traffic monitor control part 140 according to the condition of traffics of the communication circuits L1 through L4 if necessary. Further, this apparatus 100 has a data file storage part 120, in which various sorts of table data or such are stored to be referred to by the distribution control part 110 when it carries out distribution control. The data stored there includes a load rate table, a standby circuit exclusive tag table, an hourly table, traffic history data, a reference value/upper limit determination data or such, described later.

The apparatus 100 is configured to carry out operation in such a manner that the above-mentioned plurality of circuits L1 through L4 used as communication circuits between the own apparatus 100 and the opposite apparatus 200 are grouped, and a data transfer band thereby is logically increased (each circuit rate×number of circuits). Then, transmission traffics on the respective circuits L1 through L4 included in the circuit group are periodically monitored by the traffic monitor control part 140, usage rates of the respective circuits are thus calculated and recognized, and, according to the thus-obtained usage rates, processing of transferring the transmission data, i.e., transmission packets of a specific circuit among the circuit group of L1 through L4 to another circuit is carried out. By carrying out such processing, a circuit having traffic of 0% is dynamically generated thereamong.

The circuit of 0% traffic thus generated is regarded as a 'protection circuit' or a 'standby circuit'. Then, when a fault occurs in a certain circuit included in the L1 through L4 group, transmission packets transmitted by this fault circuit are transferred to this standby circuit in a lump. As a result, instantaneous recovery from the fault condition is achieved, and thus, occurrence of packet loss or such can be effectively avoided.

The above-mentioned processing of transferring of the transmission packets to the other circuit for the purpose of generating the protection circuit is carried out as a result of one circuit from among the four circuits L1 through L4 being determined as the protection circuit when the circuit usage rate of the entirety of the L1 through L4 group is lower than a predetermined 'distribution determination value' (AL). Further, when a load increases so that the circuit traffic of the entirety of the L1 through L4 group exceeds the predetermined 'protection circuit releasing determination value' (AU), the once generated 'protection circuit' is automatically released, and control is carried out such that transmission packets are transferred to this circuit once ensured as the 'protection circuit' from the circuit currently having the highest load as described later.

Further specifically, in the apparatus 100, the distribution control part 110 uses a tag number (for example, lower four digits of a transmission destination MAC address or such attached to each packet), and, a given packet is transferred to a specific port (corresponding to a specific circuit from among the four circuits) determined according to the distribution control table 111 in which these tag numbers are previously set, and is transmitted therethrough.

In this state, the traffic monitor control part 140 refers to packet holding states of transmission buffers 171, 172, 173 and 174 from which packets are transmitted to the respective circuits L1 through L4, so as to monitor the traffics of all the circuits L1 through L4 periodically, and, under a condition in which the total traffic amount is lower than a predetermined threshold (distribution determination value AL), processing is carried out such that packets held for the lowest traffic circuit are distributed to other circuits gradually. By repeating this distribution processing, a traffic flow rate in one circuit is made to be 0%, and thus, the standby (empty) circuit (i.e., the above-mentioned 'protection circuit') is generated dynamically as mentioned above.

As a result, when a fault occurs in another circuit included in the group, the standby circuit is immediately appropriated therefor. Further, when the total traffic amount of the working circuits exceeds the predetermined threshold (releasing determination value AU), processing packets are transferred to this standby circuit from a circuit having a larger traffic, in sequence (so as to releasing the standby circuit). Thus, control is made to guarantee a necessary band. Further, by repeating the above-mentioned standby circuit generating processing, it is also possible to generate a plurality of 'standby circuits', according to the total traffic amount (specifically, in a case where the total traffic amount becomes small).

By this function, it becomes possible to dynamically generate the standby circuit according to the traffic amount. As a result, when a fault occurs in a working circuit, it is possible to immediately transfer the traffic thereof to the standby circuit, and thus, it is possible to improve the reliability of communication. Further, in this function, it is also possible to carry out a control such as to dynamically release this standby circuit allocation so a to guarantee the necessary band when the traffic load becomes high.

As a result of the above-mentioned packet distribution processing, a load of another working circuit thus receiving the distribution for the purpose of creating the standby circuit may become too high. In order to avoid such a situation, in the present apparatus, also for the circuits other than the standby circuit, processing is carried out such that, based on the traffic values of the respective circuits obtained as mentioned above, packets of the circuit having the high traffic is distributed to other circuits among the group.

That is, there may occur a situation in which, after the packet distribution control is carried out, even through the total-traffic amount is lower than the predetermined threshold (distribution determination value), a traffic load concentrates on a specific circuit and as a result, it becomes higher than a threshold. In such a situation, the traffic loads are equalized as a result of processing being carried out such that, without releasing the standby circuit, packets to process may be distributed to the lower traffic circuit from the highest traffic circuit among the currently working circuits.

By carrying out such working circuit load equalization processing, it is possible to avoid an imbalance condition in which, even through the total load amount is not so large, a load rate of a specific circuit is too high. Thereby, it is possible to equalize the usage load rates, not releasing but maintaining the once dynamically generated standby circuit.

Further, in the present apparatus, distribution processing may be carried out when the detected total traffic amount becomes lower than the above-mentioned 'distribution determination value' AL, n times, successively within a predetermined monitoring period. Similarly, when the detected total traffic amount exceeds the 'protection releasing determination value' AU, n' times, successively, the vacancy state of the standby circuit may be cancelled, and packet transmission with the use of even this circuit may be carried out. By applying such a dynamic packet-distribution protection-time function in which the n times or the n' times of increasing or decreasing are required for actually initializing the standby circuit releasing or generation processing, it is possible to avoid a situation in which the distribution is repeated each time when data transmission load increases or decreases in a burst manner, and thus, it is possible to avoid a flip-flop phenomenon (a phenomenon in which generation and releasing of the standby circuit are repeated at short time intervals) of distribution control otherwise occurring due to instantaneous packet concentration or such.

That is, when the 'distribution processing' were carried out each time when the detected total traffic amount becomes lower than the predetermined 'distribution determination value' AL or exceeds the predetermined 'releasing determination value' AU, distribution would not necessarily be carried out actually for achieving an appropriate load rate (rather, in such a case, unnecessary distribution would occur) when the traffic changes in a burst manner, or unnecessary software processing would occur for the distribution processing for a case where the traffic amount changes slightly around the predetermined determination value, whereby the CPU load would increase. In order to avoid such a situation, as mentioned above, a protection time interval (number of times, or a 'control dead zone') is preferably provided, and, the actual distribution processing or releasing processing is carried out preferably after the condition for the distribution determination value AL or for the releasing determination value AU is satisfied the predetermined times successively.

Figure 4A:
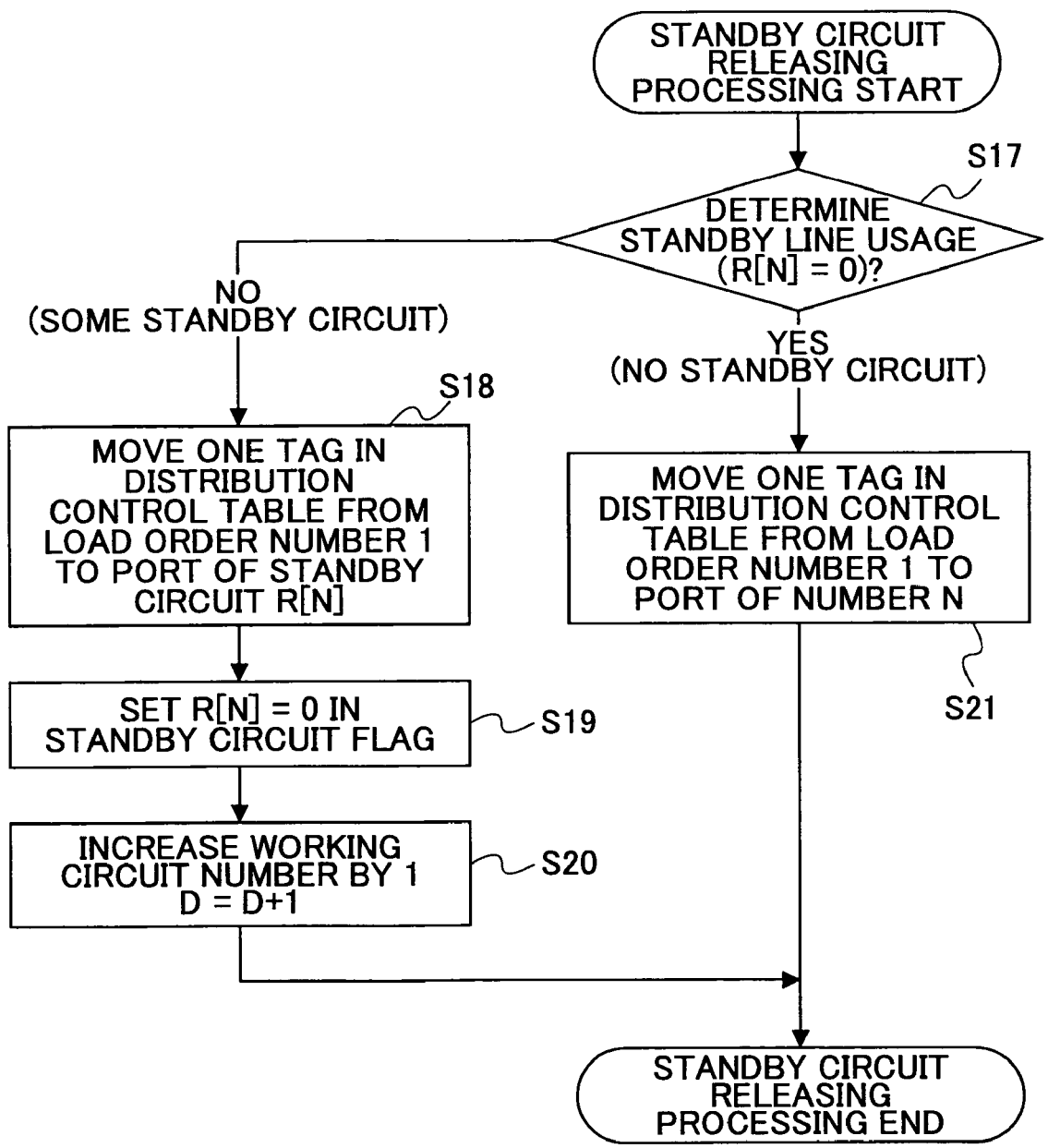

Next, the above-described processing is described in detail. FIG. 2A shows a flow chart showing a flow of the processing described above. First, the traffic monitor control part 140 receiving an interrupt from a period timer of the above-mentioned time management part 160, derives the circuit load rates of the circuits L1 through L4 from the storage-states of the transmission buffers 171 through 174 of all the ports, and creates a load rate table as shown in FIG. 2C (N=4 in the example of FIG. 1) (Step S1). Then, a total value S (detected total traffic amount) of the circuit load rates is calculated (Step S2), it is determined whether or not the total value is smaller than the predetermined 'distribution determination value' AL or is larger than the predetermined 'releasing determination value' AU (Steps S3-1, S3-2). As a result, when it is smaller than AL (Yes in Step S3-1), 'standby circuit generation processing' described later with reference to FIGS. 3A and 3B is carried out (Step S4). When it is larger than AU (Yes in Step S3-2), 'standby circuit releasing processing' described later with reference to FIGS. 4A and 4B is carried out (Step S5).

Figure 5A:
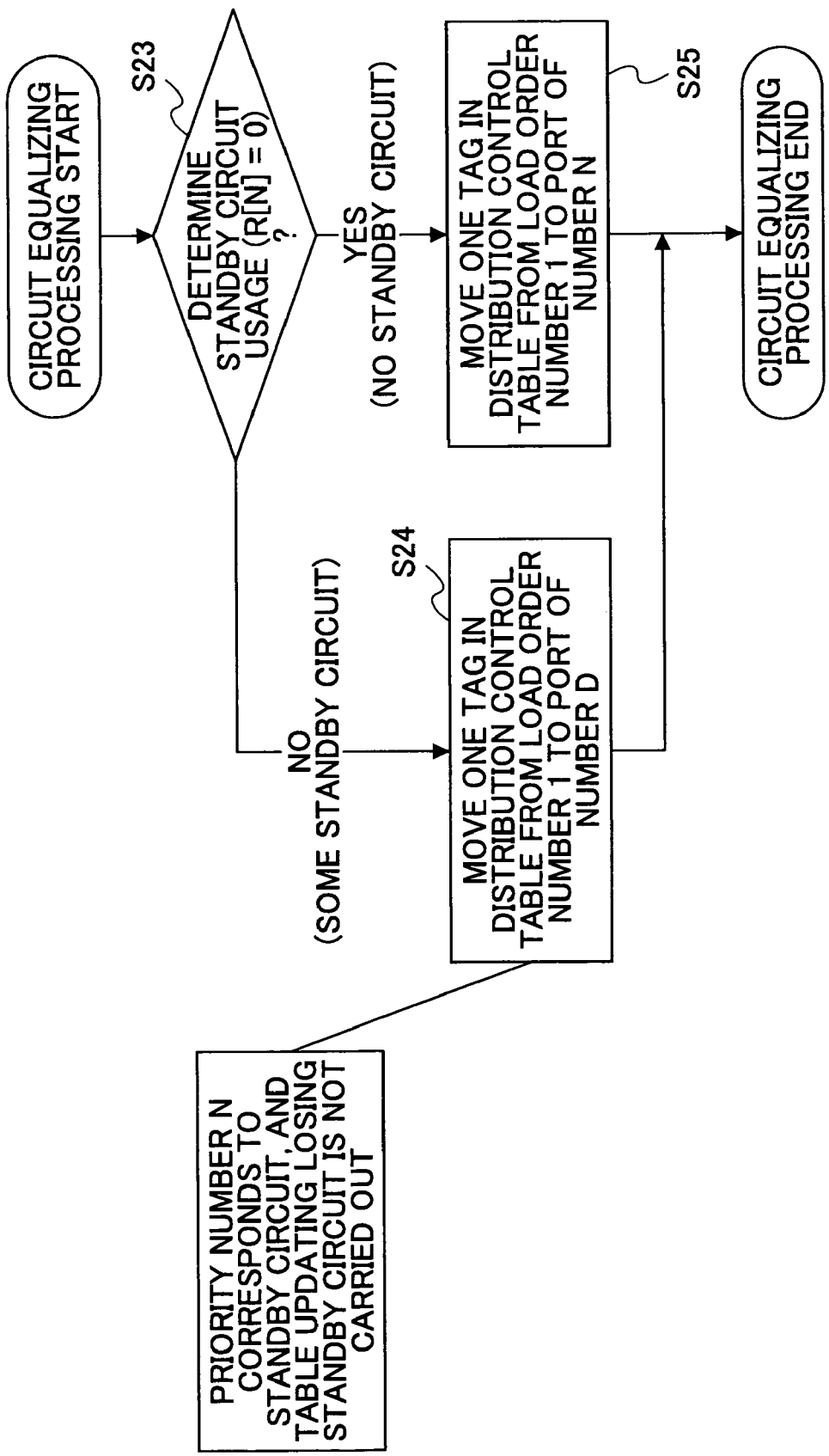
Figures 9A, 9B:
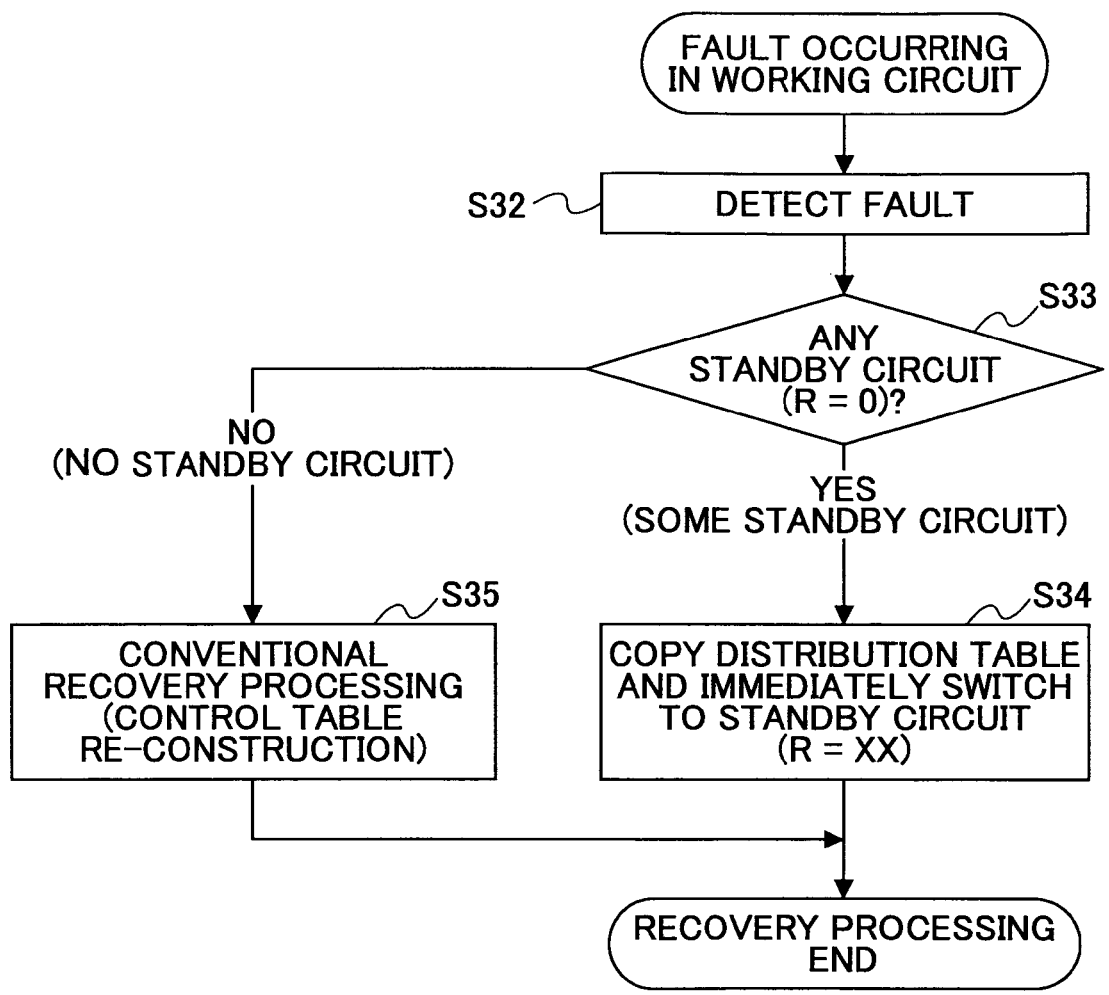
Figure 11B:
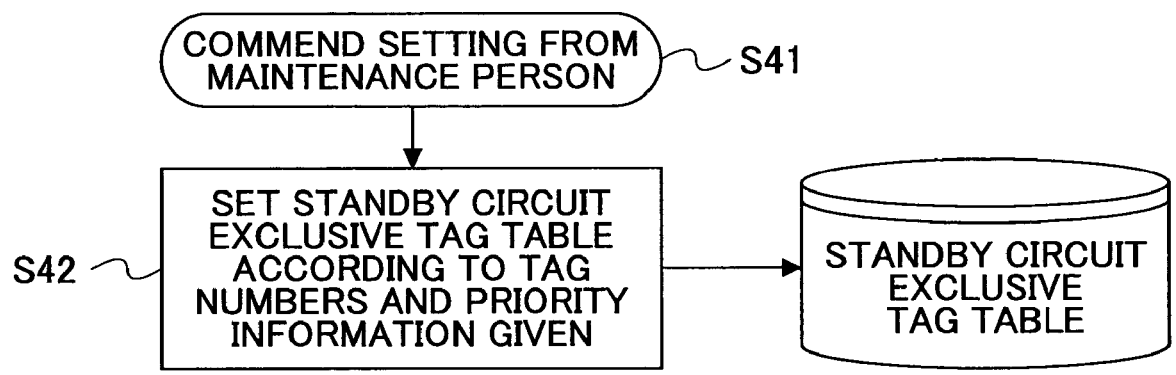

Next, it is determined whether or not any port (circuit) of the circuits L1 through L4 exceeds the predetermined 'releasing reference value' U of the detected traffic (circuit load rate) (Step S6). If any, 'circuit equalization processing' described later with reference to FIGS. 5A, 5B and 5C is carried out (Step S7). If none, a 'processing counter' described later is cleared (Step S8). After that, a timer interrupt waiting state is entered again.

FIG. 3A shows a flow of operation of the above-mentioned 'standby circuit generation processing'. In this standby circuit generation processing, first, the above-mentioned 'processing counter' is applied (Step S9), it is determined (Step S10) whether or not a count value of the processing counter exceeds a predetermined 'protection times' described later, and, when it does not exceed the protection times, the standby circuit generation processing is not carried out actually. Thus, the current operation is finished. On the other hand, when the count value exceeds the protection times, the processor counter is initialized or cleared (Step S11), and, in the distribution control table 111 shown in FIG. 1, a tag number is moved from a port having the lowest (traffic) load (that is, the port for the circuit having the lowest traffic) to a port having a load which is immediately higher than the above-mentioned port with reference to the load rate table such as that shown in FIG. 2C.

The tag numbers assigned to the respective port numbers 1 through 4 (corresponding to the circuits L1 through L4, respectively) in the distribution control table 111 are numbers used for identifying packets to be distributed to the respective circuits. That is, in the above-mentioned example, each tag number corresponds to the lowest four digits of a MAC address of each packet.

In the load rate table shown in FIG. 2C, it is assumed that the load order is determined in such a manner that, for the ports having the same load rate, the load order is determined in the descending sequence of the respective port numbers. After that, it is determined whether or not 'the standby circuit' has been generated (Step S13), and, when it has been generated, the port number of the relevant circuit is set in a 'standby circuit flag' (Step S14), a 'working circuit number' value D is decreased by one (Step S15), and the current processing is finished. On the other hand, when the standby circuit has not been generated, the processing is finished. After that, when Step S4 is carried out again in the operation of FIG. 2A which is started by the timer interrupt, the processing of FIG. 3A described above is carried out again. The tag moving operation in Step S12 of the processing of FIG. 3A may thus be repeated, and, then, when the port of the lowest load finally has no tags as a result of the above-mentioned tag moving operations of removing the tags from the relevant port, a determination result of the above-mentioned Step S13 becomes Yes, this means that the standby circuit is thus generated, and as a result, operations of Steps S14 and S15 are carried out.

In the above-mentioned 'standby circuit releasing processing' shown in FIG. 4, it is determined whether or not the standby circuit has been generated (Step S17). That is, it is determined whether or not the circuit number is set in the above-mentioned standby circuit flag. When the result is that the standby circuit exists, one tag is moved from the circuit having the highest load order to the standby circuit (Step S18). After that, the standby circuit flag is set to be 0 (Step S19), and the 'working circuit number' value D is increased by one (Step S20). On the other hand, when the determination result of Step S17 is that the standby circuit does not exist, the tag is moved from the port of the highest load order to the port of the lowest load order among the working circuits (Step S21), and the processing is finished.

FIG. 5A shows a flow of the above-mentioned 'equalization processing'. First, the same as the above, the standby circuit flag is referred to, and thus, standby circuit usage determination is carried out (Step S23). The result of the determination is that the standby circuit exits, a port of the lowest load is selected from among the working circuits other than the standby circuit, and, a tag of the port of the high load is moved to the thus-selected port of the lowest load order (Step S24). Thus, even in the equalization processing, the standby circuit is not released. On the other hand, when the standby circuit does not exist determined as a result of the determination of Step S23, from a port of the highest load order, a tag is moved to the port of the lowest load order (Step S25), and the processing is finished.

With reference to FIGS. 6A through 6K, as an actual example of the above-described respective processing, a processing example is described next in detail for a case where the predetermined upper limit value (releasing reference value) U=80%, the lower limit value (distribution reference value) L=60%, and the number of ports N=4 (see FIG. 6A). In this case, as shown in FIG. 6A, the above-mentioned 'protection (standby circuit) releasing reference value' AU is obtained as follows (see FIG. 2B: AU=U*(D−1)):

$AU=80\times(4-1)=240[\%]$, based on the above-mentioned upper limit value U and the number of current working circuits D=4. Similarly, the above-mentioned 'distribution determination value' AL is obtained as follows (see FIG. 2B: AL=L*(D−1)):

$AL=60\times(4-1)=180[\%]$, based on the above-mentioned lower limit value L and the number of current working circuits D=4.

First, an example of the standby circuit generation processing is described. When the load rate table is as shown in FIG. 6B as a result of the circuit monitoring, a total of the load rates is S=150% (65+25+20+40). Since this value S is smaller than the above-mentioned distribution determination value 180%, the standby circuit generation processing is carried out. After the standby circuit generation processing is thus started, as shown in FIG. 3A, first the processing counter is incremented by one (Step S9), it is determined whether or not the count value of this counter has reached the above-mentioned protection time P, and, when the protection times are not reached, the processing is not actually carried out. On the other hand, when it is determined that the protection times are already reached, a tag (in the example, a tag number '19', see FIG. 6E) of a port (in the example, the port '3': 20%) of the lowest load rate in the distribution control table is moved to a port (in the example, the port '3') of the load immediately higher than that (for the state of FIG. 6F). Then, it is determined whether or not the standby circuit (vacant) is created (Step S13), and, when the standby circuit has been created, the port number of the relevant (standby) circuit is set in the standby circuit flag (Step S14). Thus, the processing is finished, and then, a period timer waiting state in the processing of FIG. 2A is entered again.

It is noted that the standby circuit is not necessarily generated by a single time of the above-mentioned processing. Actually, as mentioned above, the standby circuit may be generated as a result of a plurality of times of the above-mentioned processing being carried out initiated by each time of the timer interrupt in the processing of FIG. 2A. In the example of FIGS. 6A through 6K, in the first time of the timer period (for the state of FIGS. 6C and 6F), the standby circuit (port 3 or L3) is not created. Then, after the second time of the processing (FIGS. 6D and 6G) and the third time of processing (FIGS. 6H and 6J) are carried out, the set tags of the port 3 have been completely removed as a result, so that this port has no tag, in the fourth time of the processing (FIGS. 6I and 6K). Thus, the standby circuit is actually generated. As a result, the standby flag R=3 is set. In FIGS. 6B through 6K, FIGS. 6B through 6D and 6H and 6I show transition of the contents of the load rate table (from the first time through the fourth time). On the other hand, FIGS. 6E through 6G, 6J and 6K show corresponding transition of the contents of the distribution control table 111.

With reference to FIGS. 7A through 7G, an example of the above-mentioned 'standby circuit releasing processing' is described next. When the load rate table is as shown in FIG. 7B as a result of the circuit monitoring, the total of the load rates S=190% is obtained, this value is larger than the protection releasing determination value AU=160% (see FIG. 7A) calculated based on the above-mentioned upper limit value U=80% and the number of the current working circuits D=3, and thus, the standby circuit releasing processing is actually carried out.

That is, as shown in FIG. 4A, in Step S17, it is determined whether or not the standby circuit exists (the standby circuit flag R=0 indicates that no standby circuit exits). When the standby circuit exists, the flag R=0 is set, and thus, the flag is made to indicate the standby circuit released state. Then, one set tag (in this case, "23") is moved from the port (in this case, the port '1': 75%) of the higher load rate to the port (the standby port) of the lowest load rate, the processing is finished, and the timer waiting state of FIG. 2A is entered again. On the other hand, when no standby circuit exits (No in Step S17), and also, the above-mentioned detected total traffic amount 190% is larger than the releasing determination value 160% (Yes in Step S3-2), the processing shown in FIG. 4A is to be carried out, and, in Step S21, a tag is moved from the port of the highest load rate to the port of the lowest load rate. Thus, equalization of the load rates is aimed at.

In the example of FIGS. 7A through 7G, from the original state (FIGS. 7B and 7E), the state of FIGS. 7C and 7F is entered as a result of the first time of processing being carried out. That is, the above-mentioned tag "23" is moved from the port 1 to the port 3 of the standby circuit, thus the standby circuit is substantially released, and the standby circuit flag R=0 is set to represent this state. Further, as a result of the second time of processing being carried out, the state of FIGS. 7D and 7G appears. This is because, also in the state of FIG. 7C, the detected total traffic amount is 195% (70+65+10+50).

As a result, the same as the above, the standby circuit releasing processing is to be carried out also at this time. Then, a tag "22" is moved from the port 1 of the highest load rate to the port 3 of the lowest load rate so that equalization of the load rates is aimed at. Also in this case, FIGS. 7B, 7C and 7D show transition of the contents of the load rate table, while FIGS. 7E, 7F and 7G show corresponding transition of the contents of the distribution control table.

An example of the 'circuit equalization processing' is described next with reference to FIGS. 8A through 8G. That is, when the load rate table is such as that shown in FIG. 8B as a result of the circuit monitoring, a total of the load rates is obtained as S=155%, this is larger than the distribution determination value 120% (see FIG. 8A) but is smaller than the releasing determination value 160% (see FIG. 8A). Accordingly, neither the standby circuit generation nor releasing processing is carried out. However, as shown in the load table of FIG. 8B, the load rate of only the port 1 (90%) exceeds the above-mentioned upper limit value U=80% (seer FIG. 8A) (Yes in Step S6 of FIG. 2A). As a result, the circuit equalization processing shown in FIG. 5A is carried out.

As shown in the flow of FIG. 5A, the standby circuit flag is used to determine whether or not the standby circuit exists (in the example of FIGS. 8B and 8E, the port 3 is the standby circuit). Then, one tag is moved from the port (port 1) of the highest load rate to the port (port 4) of the lowest load rate (=40%) from among the working circuits other than the standby circuit, and the processing is finished. In this case, the standby circuit (port 3) is kept as being free of tags (see FIGS. 8C and 8F). Similarly, in this state, the detected total traffic amount is 155%, same as the above, as a result of the circuit monitoring again. Further, the highest load rate (=80%) of the port 1 is equal to the upper limit value 80%. As a result, the determination in Step S6 of FIG. 5A is also Yes. Then, a tag "22" is moved therefrom to the circuit (port 2) having the lowest load rate currently. As a result, the state of FIGS. 8D and 8G appears. In this equalization processing, the standby circuit is maintained active, that is, is kept free of tags, while traffic load equalization among the other working circuits is aimed at, and thus, as shown in FIG. 8D, the state in which no circuit exceeding the above-mentioned upper limit value 80% exists appears (in this example, the load rate lies within a range between 65% and 40%).

Next, operation of recovery from a fault occurring in a working circuit in the apparatus 100 according to the embodiment of the present invention is described with reference to FIGS. 9A, 9B, 10A and 10B, in a manner of citing an actual example. When a fault on a working circuit is detected (Step S32, in this case, a fault on the port 1 is assumed, see FIG. 10B), it is determined from the standby circuit flag whether or not the standby circuit exists (Step S33). When the standby circuit exists (in this case, the port 3 is the standby circuit, see FIG. 10A), the set tag information of the relevant port (port 1) of the fault occurrence circuit in the distribution control table is copied to the port (port 3) of the standby circuit in a lump. Then, according to the thus-altered contents of the distribution control table, all the packets corresponding to the thus-copied tags are transferred to the standby circuit (port 3), and thereby, immediate switching for the fault recovery is achieved (Step S34).

On the other hand, when the standby circuit does not exist (No in Step S33), conventional recovery processing is carried out. That is, the tag numbers of the fault circuit are distributed to the other circuits in consideration of the entire balance of the load rates of the respective circuits.

Next, as another function of the communication apparatus 100 according to the embodiment of the present invention, a 'low priority usage function' is described. By this function, when the protection circuit (standby circuit) is produced in the above-described processing, this protection circuit is made usable by predetermined users of lower priority. It is noted that, when a fault occurs on another circuit, even after the protection circuit is thus made usable by predetermined users of lower priority, immediate transfer of the traffic load of the fault circuit in a lump to the protection circuit is carried out in the above-described processing. As a result, the above-mentioned predetermined lower priority packets cannot be actually transmitted. Further, it is also possible to make a setting such that, not only for a case where a fault occurs, but also for a case where a traffic of a high priority circuit increases much, the protection circuit is released the same as the above. Also in this case, the same as the above, the predetermined low priority packets transmitted by the protection circuit until then cannot be transmitted thereafter.

Further, in addition to the above-mentioned function, when a plurality of protection circuits are generated, they may also be set as being usable by predetermined lower priority users. In this case, it is preferable that these lower priority users are classified according to a priority order corresponding to the number of the thus-generated protection circuits, and thus are assigned to the respective protection circuits. Then, upon fault occurrence on a working circuit, these protection circuits are used to receive the traffic of the fault circuit in such a manner that one having the lower priority is used earlier.

That is, if once generated standby circuits are always kept unused to be prepared for a possible fault occurring on another working circuit, proper effective usage of the resources may not be achieved. The above-mentioned 'lower priority usage function' is advantageous in this light. In order to transmit a predetermined sort of data with the use of the standby circuit according to this function, a standby circuit exclusive tag table (see FIG. 15) is provided for identifying the 'standby circuit exclusive data' which is the above-mentioned predetermined sort of data (data for the lower priority contract users) in the embodiment of the present invention. This table may be set according to a user's command via the command processing part 130.

In this function, when the standby circuit is not ensured, the above-mentioned standby circuit exclusive tags are not managed in the distribution control table, and thus, input data corresponding to the standby circuit exclusive tag is discarded in the distribution control part. On the other hand, when the standby circuit is ensured in the above-described processing, the tags designated in the standby circuit exclusive tag table are set in the distribution control table for the thus-generated standby circuit, and thus, transmission of the relevant packets can be started.

Figures 15, 16A, 16B:
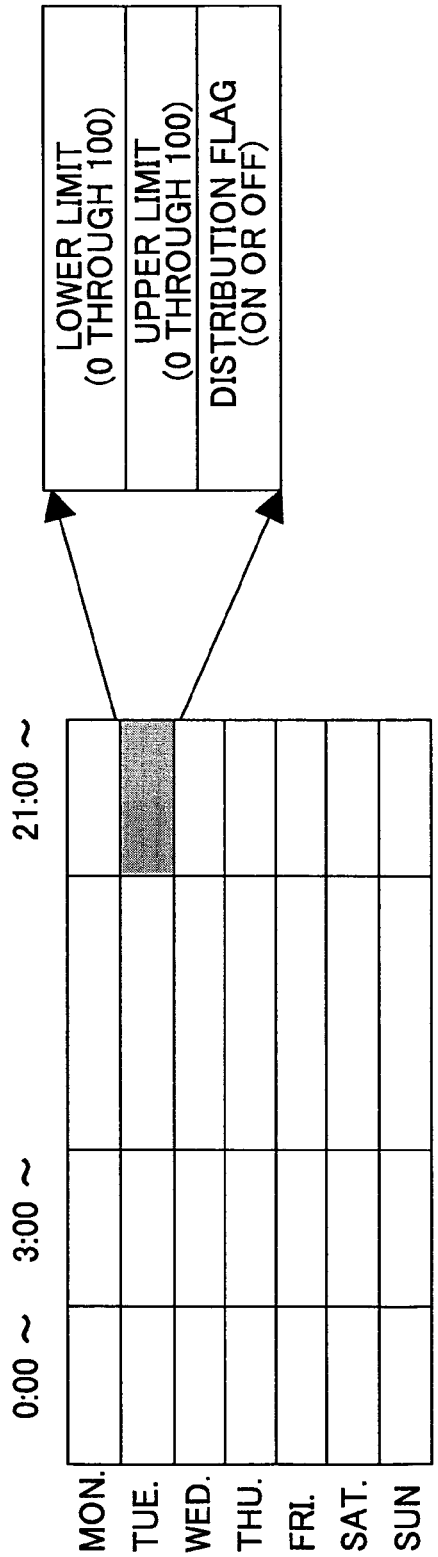
FIG. 15 illustrates a standby circuit exclusive tag table used in the standby circuit exclusive transmission processing carried out by the communication apparatus according to the embodiment of the present invention.
FIGS. 16A and 16B illustrate an hourly table used in hourly setting processing carried out by the communication apparatus according to the embodiment of the present invention.

For the tags exclusive to the standby circuits, priority information is set, as shown in FIG. 15. This-priority is set for the purpose that, when traffic of the standby circuit increases, a fault occurs in a working circuit, or such, in a condition in which the standby circuit is ensured, the standby circuit for which the tag of the lower priority should be switched to a working circuit earlier in sequence according to the above-mentioned priority set for each tag as mentioned above. This priority may be set in a predetermined range in magnitude. In the example of FIG. 15, the smaller numeral has the higher priority, i.e., 5 (high priority)>10>15 (lower priority).

When the above-mentioned standby circuit releasing processing is carried out, in order to select a switching target standby circuit (the standby circuit to which a traffic is transferred actually), the traffic monitor control part 140 searches for the standby circuit of unused state from the distribution control table 111 from among the existing standby circuits. When no standby circuit of unused state exists as result, the standby circuit for which the lowest priority tag is designated is searched for from among the existing standby circuits. The switching target standby circuit is thus determined by means of the search processing, the thus-determined standby circuit is switched to act as a working circuit, and thus, is allocated for the relevant shortfall.

In this low priority usage function, for users who allow a possible time zone in which no data can be transmitted, which time zone may occur depending on a working circuit condition (that is, when the traffic increases), the standby circuit is allocated for data transmission. As mentioned above, this standby circuit exclusive data is discarded and thus is not transmitted until the standby circuit is ensured. Instead, data of relatively high priority other than the standby circuit exclusive data may be transmitted through the working circuits including a possible candidate for the standby circuit. Consequently, the band of the working circuits is guaranteed.

Further, even after the standby circuit is once ensured and therewith the low priority usage function is applied, when a fault occurs in the working circuit, the standby circuit is switched to act as a working circuit immediately. After that, the standby circuit exclusive data is not transmitted. However, after recovery is made from the circuit fault, or after the overall traffic decreases, or such, the standby circuit is again ensured, and thus, the standby circuit exclusive data can be transmitted thereby.

Thus, with the use of the lower priority usage function, control is made in such a manner that, band guarantee is always provided for data of high priority for which data transmission band should be always guaranteed, while, for data of lower priority for which no such guarantee is required, the data is transmitted only in a case where the standby circuit is ensured. As a result, it is possible to effectively use the resources while the transmission reliability is improved.

With reference to FIGS. 11A, 11B, 12, 13A through 13E, 14A through 14E, the above-mentioned lower priority usage function is described next in detail. A maintenance person designates, in a command, tag numbers and priorities to be used exclusively for the standby circuits (Step S41). Thereby, the command processing part 130 carries out setting them in the standby circuit exclusive tag table (see FIG. 15) (Step S42). On the other hand, the traffic monitor control part 140 carries out the circuit monitoring and distribution determination processing (Step S44) described above with reference to FIG. 2A, for each predetermined period (Step S43). The traffic monitor control part 140 determines whether or not the standby circuit has been generated (Step S45), or whether or not the standby circuit has been changed to act as a working circuit (Step S46).

When the standby circuit is generated, the distribution control table 111 is searched, with reference to the standby circuit exclusive tag table (FIG. 15), and it is determined whether or not the standby circuit exclusive tag is set in the distribution control table 111 for the thus-generated standby circuit. When no standby circuit exclusive tag has been registered, the standby circuit exclusive tags are then assigned for the standby circuit in the distribution contort table 111 (Step S54). As a result of the standby circuit exclusive tags being thus assigned in the distribution control table 111, the distribution control part 110 assigned data corresponding to the standby circuit exclusive tags to the relevant standby circuits according to the table data, and thus, the relevant data is actually transmitted.

Figure 12:
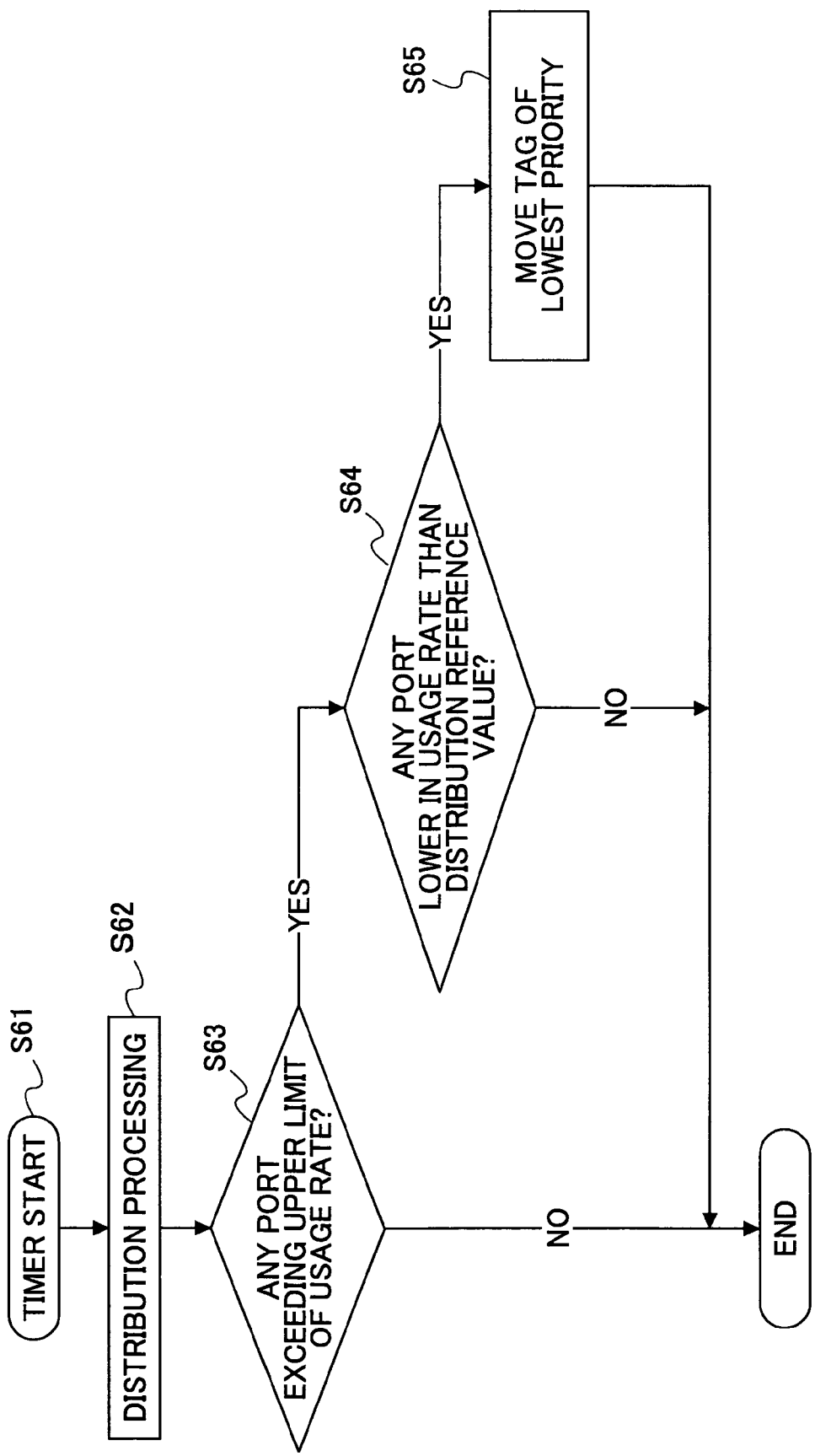

When the standby circuits are ensured in a case where the lower priority usage function is applied, distribution processing is carried out also for this part. FIG. 12 shows an operation flow in this case. That is, in addition to the working circuit monitoring and distribution control processing (Step S62) in the ordinary state described above with reference to FIG. 2A, it is determined, at predetermined intervals (Step S61), whether or not the traffic on any standby circuit exceeds a predetermined releasing reference value (Step S63) after the end of the above-mentioned ordinary distribution determination processing (S62). When the releasing reference value is exceeded, determined from the distribution control table 111, it is determined whether or not a circuit of unused state exists from among the standby circuits, or whether or not the standby circuit lower than a predetermined distribution reference value exists (Step S64). When a circuit having traffic lower than the predetermined distribution reference value exists among the standby circuits as a result of the determination, the standby circuit exclusive tag of the lowest priority is moved to the port of the relevant circuit having the traffic lower than the predetermined distribution reference value (Step S65).

Thus, when the plurality of standby circuits are ensured, dynamic traffic control may be carried out also for the standby circuit exclusive data. Also in this processing, it is preferable to provide the above-mentioned 'protection times', whereby flip-flop phenomenon of the control is avoided.

Returning to FIG. 11A, in Step S46, when the standby circuit is released in the processing shown in FIG. 4A, the distribution control table is referred to, and it is determined in Step S47-1, for each of the circuits acting as the standby circuits, whether or not the standby circuit exclusive tags are assigned (Step S48). When it is thus determined that the standby circuit which is not assigned with the standby circuit exclusive tags or is not used for transmitting the corresponding standby circuit exclusive packets exists, the distribution control table is changed, and, the standby circuit is switched to have a higher priority to act as a working circuit, in sequence, if necessary, to be applied for a shortfall (Step S52).

On the other hand, when any standby circuit which is not used to transmit standby circuit exclusive packets does not exist, it is determined in Steps S42-2, S49 whether or not the plurality of standby circuits are ensured. When the plurality of the standby circuits exist, a circuit thereamong for which a lower priority tag is assigned is switched to act as a working circuit with a higher priority, in sequence (Step S51). At this time, however, when only one standby circuit exists, this circuit is unconditionally switched to act as a working circuit (Step S50).

With reference to FIGS. 13A through 13E and FIGS. 14A through 14E, procedure of altering the distribution control table 111 in response to a change in the detected traffic in a case where the standby circuit exclusive tag table shown in FIG. 15 is set is described. In this case, for the propose of convenience for the description, it is assumed that total five ports, resulting from adding one port to the four ports shown in FIG. 1, is regarded as one group.

First, it is assumed that the distribution control table is such as that shown in FIG. 13A. Then, in the standby circuit generation processing carried out from the distribution determination processing of FIG. 2A, a tag '112' registered in the port 3 is moved to the port 2, whereby the standby circuit (port 3), which thus has no tags assigned, is ensured. In such a case where the standby circuit is ensured, tag numbers '200, 34, 2, 79' (see FIG. 15), previously registered as the standby circuit exclusive tags, are then registered in the port 3 thus ensured as the standby circuit, and thus, the distribution control table is changed to the state shown in FIG. 13B accordingly.

As a result, data (standby circuit exclusive packets) is transmitted accordingly via the port 3, i.e., the standby circuit, thereby the traffic is changed from the state of FIG. 14A to the state of FIG. 14B. Further, by means of the distribution determination processing of FIG. 2A and the standby circuit generation processing of FIG. 3A, processing is carried out to make the port 5 into a vacant port, and thus, a tag '7' set in the port 5 is moved to the port 1 (FIG. 13C). That is, at this time, the plurality of standby circuits (two circuits: ports 3 and 5) are ensured.

As a result, the two standby circuits are thus ensured, and one circuit (port 3) thereof is used for transmitting data corresponding to the standby circuit exclusive tags '200, 34, 2, 79'. On the other hand, the traffic of the port 5 (FIG. 14C) becomes 0% (see FIG. 13C) since this circuit is made to become a vacant circuit as a result of the tags set therein being removed as mentioned above. In this state, as shown in FIG. 14C, it is assumed that the traffic of the port 3 increases to become 85%, and thus, it exceeds the releasing reference value (U=80%). In this case, the tag '79: the priority order of 15' (see FIG. 15) having the lowest priority among the standby circuit exclusive tags managed in the port 3 is moved to the other standby circuit port 5 (the state of FIG. 13D thus results). In response to this tag movement, packets are transferred to the circuit of the port 5 accordingly, and, consequently, the traffics tend to be equalized, as shown in FIG. 14D.

Further, it is assumed that, in this state, the fault monitor and switch control part 150 detects a circuit fault (on the circuit of the port 1). In this case, it is assumed that the traffics change to those shown in FIG. 14E. In this case, in the fault recovery processing of FIG. 9A, the tags '1, 5, 12, 28, 7' currently managed in the port 1 (working circuit having the fault as mentioned above) are moved to the port 5 in which the tag of the low priority is currently assigned as mentioned above, and thereby, this standby circuit is switched to act as a working circuit substitute for the circuit of the port 1 having the fault and thus to transmits the packets which should originally be transmitted by the circuit or the port 1 (FIG. 13E). In this case, as mentioned above, the tag '79' of the low priority among the standby circuit exclusive tags set in the port 5 is deleted, and thereafter, relevant packets (standby circuit exclusive packets) are discarded.

Thus, in a case where the plurality of standby circuits are managed, when a necessity arises to switch them to act as working circuits, the standby circuit of currently not used state is searched for and is used to satisfy the necessity first. However, if none has been thus found as a result of the search, the standby circuit in which a low priority tag is managed is used for the same purpose instead. The same manner is applied also when, in any working circuit, the releasing reference value is exceeded in the circuit monitoring processing of FIG. 2A. That is, first, the standby circuit, which is currently not used, or, if such a standby circuit does not exist, the standby circuit in which the low priority tag is assigned is switched to act as a working circuit.

As a further another function of the present embodiment of the present invention, a function (referred to as 'hourly setting function') by which: time zones obtained from a time axis being divided in predetermined stages (days of week; a time zone; or such); in each of the thus-divided time zone the above-mentioned distribution reference value for generating the protection circuit (standby circuit) and the releasing reference value for releasing the once generated protection circuit (standby circuit) are set; and further, these values may be altered under control according to a command or such given by a maintenance person or a user, is described next.

In this function, by means of control according to a command or such from the maintenance person or a user, execution/cancellation of the function according to the present invention described above is set for each time zone, and, the apparatus is operated according to the thus-set scheduling. In this function, a tendency of possible occurrence of a sharp traffic increase depending on a time zone is monitored, the protection circuit, i.e., the standby circuit is automatically released to act as a working circuit during a time zone which is determined as a time zone in which it becomes difficult to ensure a necessary data transmission band only within the currently set working circuits, while, when it is determined that the traffic is stabilized so that the time zone is shifted to a time zone in which the protection circuit or the standby circuit may be created, the 'circuit monitoring and distribution determination processing operation' of FIG. 2A is carried out to actually create the standby circuit.

Further, in this case, it is preferable to take the statistic of the actual traffic in respective time zones (days of week or time zones) obtained as a result of the time axis being divided, and, based on the thus-obtained actual traffic information, the reference value for carrying out the distribution processing for generating the protection circuit (standby circuit) or the protection circuit (standby circuit) releasing reference value are dynamically changed.

Furthermore, it is preferable that, the traffic statistic is collected for a predetermined time zone (a day of weak, a time zone), and, based on the thus-obtained traffic information, scheduling of carrying out/canceling (actually, by means of a 'distribution flag' described later) of the above-described function according to the present invention.

For example, an hourly table such as that shown in FIGS. 16A and 16B, for managing the above-mentioned distribution reference value (L %: lower limit) and releasing reference value (U %: upper limit) (see FIG. 2B), for each day of the week and each time zone is prepared, and, the command control part 130 has a function in which, according to a maintenance person's command, the table contents of the hourly table may be set. The thus-set values are set as the distribution reference value and the releasing reference value actually applied when a predetermined time is reached in the time management part 160 according to the hourly table shown in FIGS. 16A and 16B. The traffic monitor control part 140 carries out the circuit monitoring and distribution determination processing of FIG. 2A based on the values thus set by the time management part 160.

Further, in the hourly table shown in FIGS. 16A and 16B, for each time zone, information (distribution flag) indicating whether or not the above-mentioned distribution processing is actually carried out is provided, and this information is set in the hourly table in a function of the command control part 130 according to a maintenance person's command. Then, according to the thus-set 'distribution flag', the time management part 160 turns on the distribution determination processing when a predetermined time is reached. As a result, the traffic monitor control part 140 carries out the distribution determination processing of FIG. 2A when the above-mentioned distribution flag indicates ON, while the traffic monitor control part 140 does not carry out the destitution determination processing of FIG. 2A when this flag indicates OFF.

Figures 17A, 17B, 18:
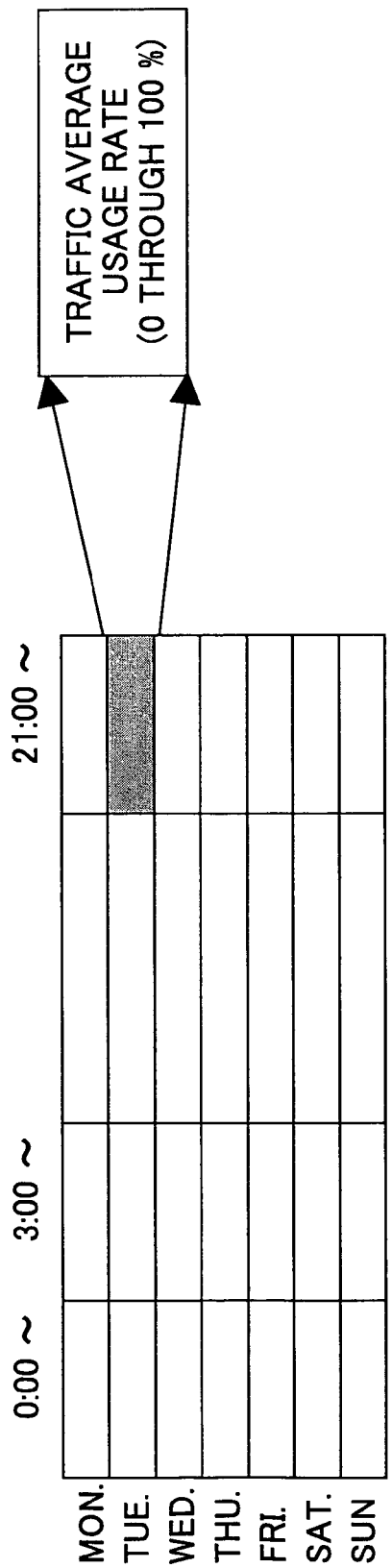
FIGS. 17A and 17B illustrate traffic history data used in the hourly setting processing carried out by the communication apparatus according to the embodiment of the present invention.
FIG. 18 illustrates a distribution optimizing table used in the hourly setting processing carried out by the communication apparatus according to the embodiment of the present invention.

Further, the traffic monitor control part 140 monitors the actual traffic condition of data transmission for each circuit, averages the thus-obtained monitoring data for each time zone, and, stores the average results in traffic history data as shown in FIGS. 17A and 17B. The thus-stored traffic history data is used by the time management part 160, after a predetermined period has elapsed, to optimize the distribution reference value (L %) and the releasing reference value (U %) based on a predetermined distribution optimizing table such as that shown in FIG. 18, and thus, the results are reflected in the hourly table shown in FIGS. 16A and 16B. In FIG. 18, for each range of the traffic usage rate (%), the distribution reference value (L %: lower limit) and the releasing reference value (U %: upper limit) to be set as designated.

The data thus reflected in the hourly table is actually applied as the distribution reference value and the releasing reference value by the time management part 160 when a predetermined time is reached. The traffic monitor control part 140 carries out the distribution determination processing of FIG. 2A based on the reference values U % and L % thus applied by the time management part 160 as described above (see FIG. 2B).

Further, the information (the above-mentioned distribution flag) which may be used for inhibiting the above-mentioned distribution determination processing when a predetermined traffic set in the optimizing table shown in FIG. 18 (actually, 80 through 100% as shown in the example of FIG. 18) is exceeded is provided, and, this information of whether or not the distribution determination processing should be actually carried out is reflected in the hourly table. The time management part 160 actually applies this distribution flag of whether or not the distribution determination processing is carried out as well as the distribution reference value and the releasing reference value when a predetermined time is reached according to the setting of the hourly table. The traffic monitor control part 140 carries out the distribution determination processing of the FIG. 2A when the distribution flag is ON, and does not carry out the distribution determination proceeding when the same flag is OFF as mentioned above.

By taking the statistic of the traffic for each predetermined time zone or each predetermined day of the weak as mentioned above, it is possible to obtain a tendency depending on users' usage ways (or the actual load condition). That is, generally, in terms of the respective days of the weak, the traffic is low on Saturday and Sunday, while the traffic tends to be high on weak days. In terms of time zones, the traffic at the middle of the night is low, for example. Accordingly, by means of the above-described hourly setting function, the distribution reference value, the releasing reference value and the distribution flag can be statically or dynamically controlled according to such an actual traffic increasing/decreasing tendency, so that occasions in which the standby circuits are easy to be created so that immediate recovery from a possible fault of a working circuit may be achieved may be effectively increased.

Figure 19:
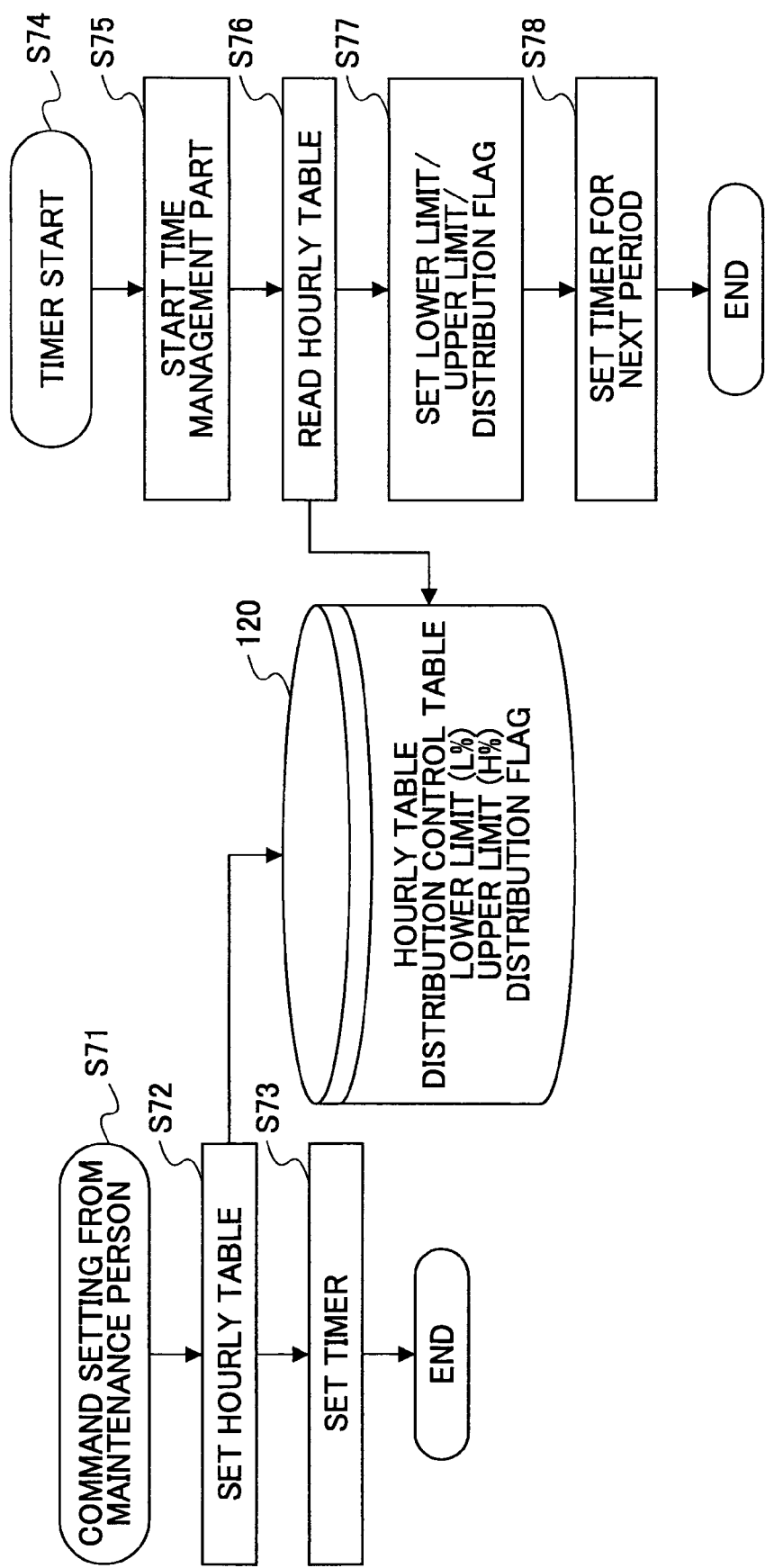
FIG. 19 shows an operation flow chart illustrating the hourly setting processing carried out by the communication apparatus according to the embodiment of the present invention.

Also with reference to FIG. 19, the above-described hourly setting function according to the embodiment of the present invention is described in detail. First, upon receiving a command setting from a maintenance person (Step S71), the command control part 130 analyzes the command, and, sets the distribution reference value and releasing reference value as well as the distribution flag for each day of the weak or each time zone in the hourly table according to the contents of the command (Step S72). Then, according to the thus-set hourly table, a timer setting is carried out with respect to the current time, for a time at which the table contents are altered subsequently (Step S73). At this time, when the timer setting has been previously carried out, this previous timer setting is once cancelled, and timer setting is newly carried out. Thus, the timer setting is always carried out with respect to the current time for a subsequent data switching or altering timing.

When the timer indicates that the thus-set time has reached (Step S74), the time management part 160 starts up (Step S75). Then, the time management part 160 refers to the hourly table (Step S76), reads data (the distribution reference value, the releasing reference value and the distribution flag) to apply for a subsequent period, and applies them in the distribution determination processing of FIG. 2A (Step S77). After the completion of this data application processing, the time management part 160 again carries out-timer setting for a time at which the set data is altered subsequently (Step S78).

For this setting value application processing, the traffic monitor control part 140 should not be aware of, and the traffic monitor control part 140 should merely carry out the distribution determination processing of FIG. 2A based on the data (the distribution reference value, the releasing reference value and the distribution flag) currently applied. When the above-mentioned distribution flag is set as ON, the distribution determination processing is carried out, while, the distribution determination processing is not carried out when this flag is set as OFF as mentioned above.

Figure 20A:
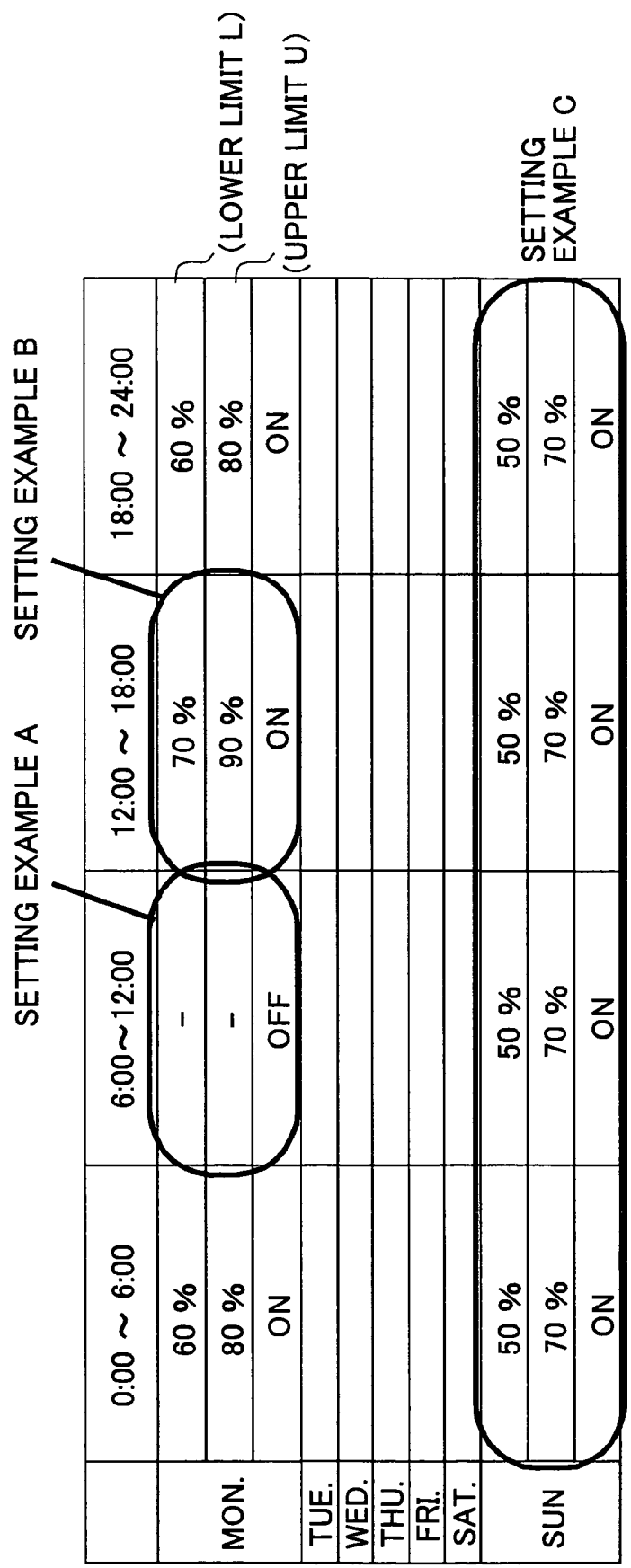

With reference to FIGS. 20A, 20B and 20C, an example of setting of the above-mentioned hourly table is described. Various manners may be applied for the setting of the hourly table. In the example of FIG. 20A, for each day of the weak, for every six hours, the setting values (the distribution reference value, the releasing reference value and the distribution flag) are provided. In this case, the data transmission band is dynamically controlled according to the set values of the total 28 types as shown (four types a day×7 days).

A specific setting manner in this case is described particularly for example. In the setting example B shown in FIG. 20A, a setting is made such that the distribution reference value is 70%; the releasing reference value is 90%; and the distribution flag is ON. In the setting example C, in the time zone between 0:00 through 24:00, that is, for a whole day, the distribution reference value is set as 50%, the releasing reference value is set as 70% and the distribution flag is set as ON. Thus, it is possible to vary the data to apply for each particular day of the weak, or for each particular time zone.

Further, in the setting example A, for the whole morning between 6:00 through 12:00, based on a tendency that the traffic is large so that the standby circuit cannot be ensued, the distribution flag is set as OFF. When the distribution flag is thus set as OFF, the processing of dynamically controlling the band described above according to the present invention is not carried out, and thus, during this period, the available traffic amount can be used as much as possible.

Thus, it is possible to determine the setting contents (the distribution reference value, the releasing reference value and the distribution flag) previously based on the actual traffic tendency.

Further, setting shown in FIG. 20B or 20C may also be carried out. The example of FIG. 20B is an example in which, without regard to the respective particular days of the weak, and, the application values are altered every four hours. The example of FIG. 20C is an example in which, the application values are not altered for each time zones, while the application values are altered solely for each day of the weak.

Figure 21:
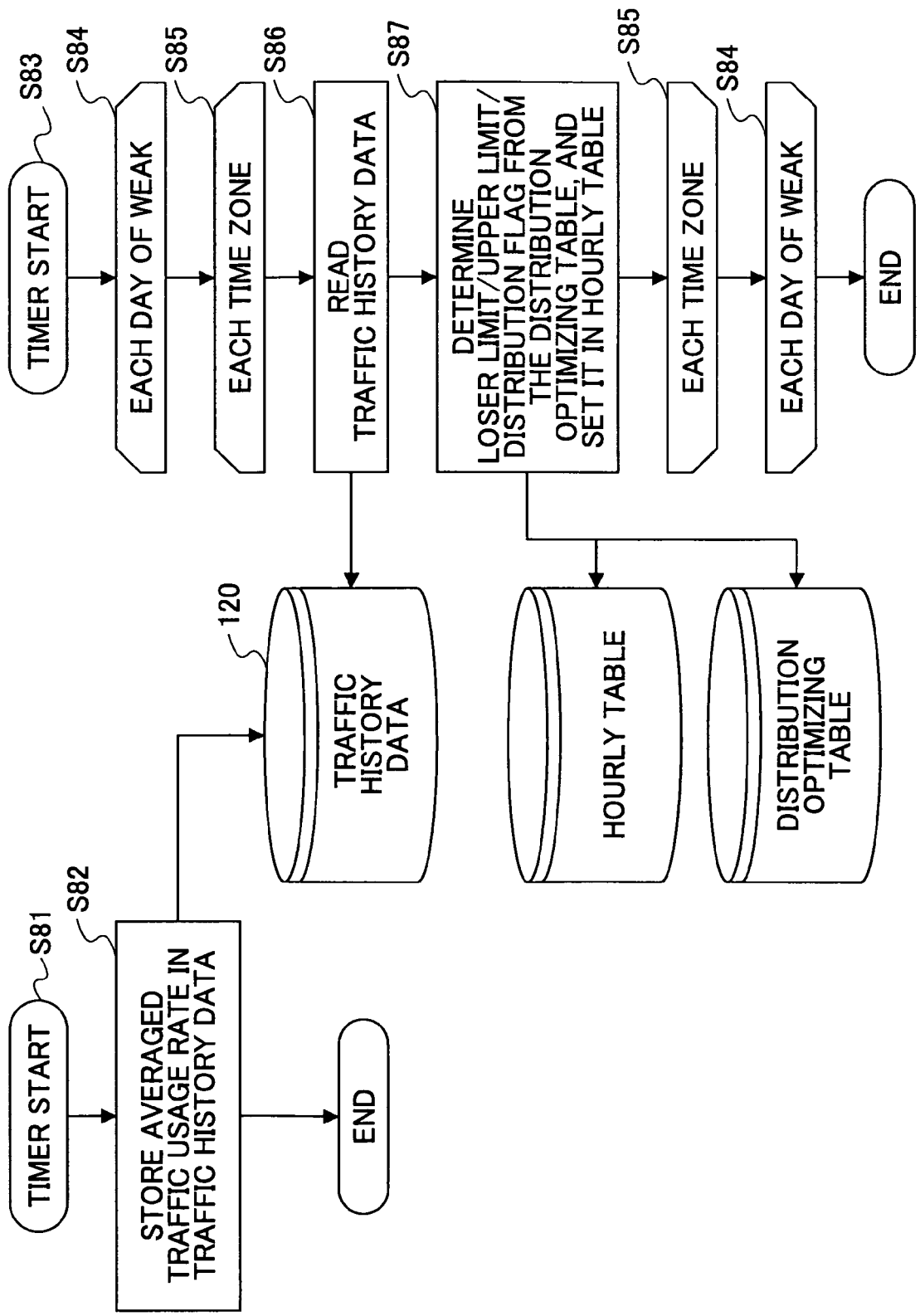
FIG. 21 shows an operation flow chart of hourly table dynamic setting operation applicable in the hourly setting processing carried out by the communication apparatus according to the embodiment of the present invention.

With reference to FIG. 21, a function further developed from the above-mentioned hourly setting function is described in detail. That is, as described above with reference to FIG. 2A, the traffic monitor control part 140 starts at each predetermined period (Step S81), and carries out the distribution determination processing of FIG. 2A. During the distribution determination processing, the detected traffic data is stored as the traffic history data shown in FIGS. 17A and 17B simultaneously (Step S82). This traffic history data includes an average of traffics detected for respective predetermined time periods. The actual data storage as the history data is carried out after the average value is thus calculated.

After the storage of the traffic history data is completed for a predetermined amount, the time management part 160 reads this traffic history data for each day of the weak or each time zone repetitively (Step S84, Step S85), obtains optimum data according to the optimizing table of FIG. 18 based on the thus-read average traffic values, and sets the thus-obtained optimized data in the hourly table of FIGS. 16A and 16B (Step S87).

As mentioned above, for this setting processing, the traffic monitor control part 140 should not be aware of, and the traffic monitor control part 140 should merely carry out processing of dynamically controlling the data transmission band according to the flow of FIG. 2A based on the thus-set data (the distribution reference value, the releasing reference value and the distribution flag). Further, at this time, the distribution determination processing of FIG. 2A is carried out when the distribution flag is set as ON, while the same processing is not carried out when the distribution flag is set as OFF.

Figures 22A, 22B:
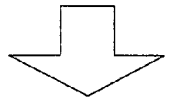

With reference to FIGS. 22A, 22B and 22C, an example of processing in which the hourly table is dynamically altered with the use of the above-mentioned distribution optimizing table of FIG. 18 is described. In this case, it is assumed that the hourly table is managed for each day of the weak and every six hours, and also it is assumed that the traffic history data managing the traffic averages has been obtained as shown in FIG. 22A. After all this data is thus obtained, based thereon, the values of the distribution reference value, the releasing reference value and the distribution flag to set are determined respectively according to the distribution optimizing table shown in FIG. 22C.

The distribution optimizing table shown in FIG. 22C has a function of applying an optimum value of each value for each 20% of the traffic (it is noted that, actually, this setting range may be altered). The hourly table shown in FIG. 22B may be made from the thus-determined optimum values. That is, for example, for Monday, 0:00 through 6:00 for which the average traffic is obtained as 20%, the data at the top in the optimizing table of the FIG. 22C is applied accordingly. As a result, the distribution reference value of 40%, the releasing reference value of 60% and the distribution flag of ON are set. For Monday, 6:00 through 12:00 for which the average traffic is obtained as 90%, the data at the bottom in the optimizing table of the FIG. 22C is applied. As a result, the distribution flag of OFF is set. Thus, it becomes possible to make a setting of the optimum values in response to the statistic information of average traffic in the hourly table.

As described above with reference to FIGS. 20A, 20B and 20C, various manners may be applied for actually setting of the values in the hourly table. The traffic history data should be obtained for each predetermined time unit set in the hourly table.

Thus, according to the configuration of the embodiment of the present invention, it is possible to dynamically create the protection circuit (standby circuit) while ensuring the maximum possible data transmission band if necessary by canceling the once-created standby circuit. Accordingly, it is possible to control preparation of a protection circuit facility requiring an investment foreseeing possible (future) failures to the minimum possible, and also, it is possible to increase occasions in which rapid circuit switching is achieved even when a circuit has a failure. Accordingly, it is possible to control interruption duration of data communication service occurring due to a possible circuit failure to the minimum possible.

Furthermore, the protection circuit (standby circuit) may be used to transmit exclusive low priority data (standby circuit exclusive packets), by which, it is possible to provide such a type of service for a user that, while a fixed band guarantee is be provided, a data communication service is provided at a reduced cost accordingly.

Furthermore, by carrying out alteration of the reference values or ON/OFF scheduling of the function according to the embodiment of the present invention statically or dynamically, it is possible to achieve more effective service operation responding to actual traffic condition.

Further, according to the present invention, for each particular circuit included in the circuit group, load distribution among the circuits can be achieved as a result of dynamic band management and control being carried out. Accordingly, it is possible to avoid load concentration at a certain part of the circuits.

Further, the present invention is not limited to the above-described embodiments, and variations and modifications may be made without departing from the basic concept of the present invention claimed below.

What is claimed is:

1. A communication apparatus which carries out data transmission in such a manner that transmission data is distributed to a predetermined plurality of data transmission circuits, comprising:

a standby circuit generating part configured to determine, when a predetermined condition is satisfied, a predetermined circuit from among the plurality of circuits as a standby circuit, wherein, when a working circuit other than the standby circuit becomes not usable, transmission data passing therethrough until then is transferred to the standby circuit; and a standby circuit releasing part configured to use the standby circuit as a working circuit when a load total value in the predetermined plurality of data transmission circuits increases, wherein:

for generating the standby circuit, said standby circuit generating part obtains a predetermined distribution determination value from multiplying a value obtained based on a number of current working circuits with a predetermined lower limit value, and generates the standby circuit in a case where the load total value is smaller than the predetermined distribution determination value, for releasing the standby circuit, said standby circuit releasing part obtains a predetermined standby circuit releasing determination value from multiplying the value obtained based on the number of current working circuits with a predetermined upper limit value, and releases the standby circuit in a case where the load total value is larger than the predetermined standby circuit releasing determination value, said standby circuit generating part carries out generation of the standby circuit by transferring transmission data of a circuit having a lowest load rate to a circuit having a second lowest load rate; and said standby circuit releasing part carries out releasing of the standby circuit by transferring transmission data of a circuit having a highest load rate to the standby circuit.

2. The communication apparatus as claimed in claim 1, wherein:

said predetermined condition comprises that the load total value of the predetermined plurality of data transmission circuits becomes smaller than the predetermined distribution determination value.

3. The communication apparatus as claimed in claim 1, wherein:

when the load total value of the predetermined plurality of data transmission circuits becomes larger than the predetermined standby circuit releasing determination value, transmission data in a circuit there among is transferred to the standby circuit, wherein the transfer of transmission data to the standby circuit is carried out in such a manner that the circuit having a higher traffic is first selected to have the own transmission data be thus transferred to the standby circuit.

4. The communication apparatus as claimed in claim 1, wherein:

the distribution of the transmission data is carried out in such a manner that a code included in predetermined data of a packet of the transmission data is designated.

5. The communication apparatus as claimed in claim 1, wherein:

processing is carried out in which traffic of the particular circuits is equalized among the working circuits other than the predetermined standby circuit.

6. The communication apparatus as claimed in claim 1, further comprising:

a monitoring part configured to detect traffic of the predetermined data communication circuits at predetermined intervals, wherein:

processing of generating the standby circuit or releasing the once-generated standby circuit is carried out only when the load total value detected becomes smaller than the predetermined distribution determination value predetermined times, or when the load total value detected becomes larger than the predetermined standby circuit releasing determination value predetermined times.

7. The communication apparatus as claimed in claim 1, wherein:

the standby circuit is used for transmitting a predetermined type of data, and, when another circuit becomes unusable, or the traffic of another circuit increases to be higher than a predetermined value, the standby circuit is used to transmit data of the other circuit with a higher priority.

8. The communication apparatus as claimed in claim 7, wherein:

a priority order is provided, corresponding to a number of the standby circuits, for the transmission of the predetermined type of data with the use of the standby circuits, and, when another circuit becomes unusable or a traffic of another circuit becomes higher than the predetermined value, the standby circuit of data transmission of a lower priority in said priority order is used earlier to transmit data of the other circuit.

9. The communication apparatus as clamed in claim 1, wherein:

a distribution reference value for generating the standby circuit or the releasing reference value for releasing the once-generated standby circuit is set each predetermined period.

10. The communication apparatus as claimed in claim 1, wherein:

a time zone is set in which the function of generating the standby circuit may be inhibited even when the predetermined condition is satisfied.

11. The communication apparatus as claimed in claim 1, wherein:

a distribution reference value for generating the standby circuit or a releasing reference value for releasing the once-generated standby circuit is automatically set for each predetermined period, based on past traffic data.

12. The communication apparatus as claimed in claim 1, wherein:

information indicating whether or not the function of generating the standby circuit upon satisfaction of the predetermined condition is activated is automatically set for each predetermined period, based on past traffic data.

13. A control method for carrying out data transmission in such a manner that transmission data is distributed to a predetermined plurality of data transmission circuits, comprising:

determining, when a predetermined condition is satisfied, a predetermined circuit from among the plurality of circuits as a standby circuit, and, transferring, when a working circuit other than the standby circuit becomes not usable, transmission data passing therethrough until then to the standby circuit, or, using the standby circuit as a working circuit when a load total value in the predetermined plurality of data transmission circuits increases, for generating the standby circuit, obtaining a predetermined distribution determination value from multiplying a value obtained based on a number of current working circuits with a predetermined lower limit value, and generating the standby circuit in a case where the load total value is smaller than the predetermined distribution determination value, for releasing the standby circuit, obtaining a predetermined standby circuit releasing determination value from multiplying a value obtained based on the number of current working circuits with a predetermined upper limit value, and releasing the standby circuit in a case where the load total value is larger than the predetermined standby circuit releasing determination value, carrying out generation of the standby circuit by transferring transmission data of a circuit having the lowest load rate to a circuit having a second lowest load rate; and carrying out releasing of the standby circuit by transferring transmission data of a circuit having a highest load rate to the standby circuit.

14. The control method as claimed in claim 13, wherein:
said predetermined condition comprises that the load total value of the predetermined plurality of data transmission circuits becomes smaller than a predetermined distribution determination value.

15. The control method as claimed in claim 13, wherein:
when the load total value of the predetermined plurality of data transmission circuits becomes larger than the predetermined standby circuit releasing determination value, transmission data in a circuit thereamong is transferred to the standby circuit, wherein the transfer of transmission data to the standby circuit is carried out in such a manner that the circuit having a higher traffic is first selected to have the own transmission data be thus transferred to the standby circuit.

16. The control method as claimed in claim 13, wherein:
the distribution of the transmission data is carried out in such a manner that a code included in predetermined data of a packet of the transmission data is designated.

17. The control method as claimed in claim 13, wherein:
processing is carried out in which traffic of the particular circuits is equalized among the working circuits other than the predetermined standby circuit.

18. The control method as claimed in claim 13, further comprising:
detecting traffic of the predetermined data communication circuits at predetermined intervals, wherein:
processing of generating the standby circuit or releasing the once-generated standby circuit is carried out only when the load total value detected becomes smaller than the predetermined distribution determination value predetermined times, or when the load total value detected becomes larger than the predetermined standby circuit releasing determination value predetermined times.

19. The control method as claimed in claim 13, wherein:
the standby circuit is used for transmitting a predetermined type of data, and, when another circuit becomes unusable, or the traffic of another circuit increases to be higher than a predetermined value, the standby circuit is used to transmit data of the other circuit with a higher priority.

20. The control method as claimed in claim 19, wherein:
a priority order is provided, corresponding to a number of the standby circuits, for the transmission of the predetermined type of data with the use of the standby circuits, and, when another circuit becomes unusable or a traffic of another circuit becomes higher than the predetermined value, the standby circuit of data transmission of a lower priority in said priority order is used earlier to transmit data of the other circuit.

21. The control method as clamed in claim 13, wherein:
a distribution reference value for generating the standby circuit or a releasing reference value for releasing the once-generated standby circuit is set at each predetermined period.

22. The control method as claimed in claim 13, wherein:
a time zone is set in which the function of generating the standby circuit may be inhibited even when the predetermined condition is satisfied.

23. The control method as claimed in claim 13, wherein:
a distribution reference value for generating the standby circuit or a releasing reference value for releasing the once-created standby circuit is automatically set for each predetermined period, based on past traffic data.

24. The control method as claimed in claim 13, wherein:
information indicating whether or not the function of generating the standby circuit upon satisfaction of the predetermined condition is activated is automatically set for each predetermined period, based on past traffic data.

25. A computer readable information recording medium storing therein a program comprising instructions for causing a computer to execute the control method claimed in claim 13.

26. A computer readable information recording medium storing therein a program comprising instructions for causing a computer to execute the control method claimed in claim 14.

27. A computer readable information recording medium storing therein a program comprising instructions for causing a computer to execute the control method claimed in claim 15.

28. A computer readable information recording medium storing therein a program comprising instructions for causing a computer to execute the control method claimed in claim 16.

29. A computer readable information recording medium storing therein a program comprising instructions for causing a computer to execute the control method claimed in claim 17.

30. A computer readable information recording medium storing therein a program comprising instructions for causing a computer to execute the control method claimed in claim 18.

31. A computer readable information recording medium storing therein a program comprising instructions for causing a computer to execute the control method claimed in claim 19.

32. A computer readable information recording medium storing therein a program comprising instructions for causing a computer to execute the control method claimed in claim 20.

33. A computer readable information recording medium storing therein a program comprising instructions for causing a computer to execute the control method claimed in claim 21.

34. A computer readable information recording medium storing therein a program comprising instructions for causing a computer to execute the control method claimed in claim 22.

35. A computer readable information recording medium storing therein a program comprising instructions for causing a computer to execute the control method claimed in claim 23.

36. A computer readable information recording medium storing therein a program comprising instructions for causing a computer to execute the control method claimed in claim 24.

* * * * *